US012098620B1

(12) United States Patent
Zhang et al.

(10) Patent No.: US 12,098,620 B1
(45) Date of Patent: Sep. 24, 2024

(54) METHODS AND SYSTEMS FOR ASSESSING GEOLOGICAL CARBON DIOXIDE STORAGE CAPACITY

(71) Applicants: PEKING UNIVERSITY, Beijing (CN); ORDOS RESEARCH INSTITUTE OF ENERGY, PEKING UNIVERSITY, Ordos (CN)

(72) Inventors: Kaiqiang Zhang, Beijing (CN); Ziqing Pan, Beijing (CN)

(73) Assignees: PEKING UNIVERSITY, Beijing (CN); ORDOS RESEARCH INSTITUTE OF ENERGY, PEKING UNIVERSITY, Ordos (CN)

( * ) Notice: Subject to any disclaimer, the term of this patent is extended or adjusted under 35 U.S.C. 154(b) by 0 days.

(21) Appl. No.: 18/414,418

(22) Filed: Jan. 16, 2024

(30) Foreign Application Priority Data

Oct. 13, 2023 (CN) .......................... 202311322947.X

(51) Int. Cl.
*E21B 41/00* (2006.01)
*G06F 17/16* (2006.01)

(52) U.S. Cl.
CPC .......... *E21B 41/0064* (2013.01); *G06F 17/16* (2013.01)

(58) Field of Classification Search
CPC ................. E21B 41/0064; G06F 17/16
See application file for complete search history.

(56) References Cited

U.S. PATENT DOCUMENTS

2010/0299126 A1  11/2010  Chugunov et al.

FOREIGN PATENT DOCUMENTS

| CN | 113101789 A | 7/2021 |
| CN | 115829153 A | 3/2023 |
| CN | 116109033 A | 5/2023 |
| CN | 116307810 A | 6/2023 |
| CN | 116451846 A | 7/2023 |
| CN | 116452056 A | 7/2023 |
| WO | 2023102046 A1 | 6/2023 |

OTHER PUBLICATIONS

P.N.K. De Silva, P.G. Ranjith, "A study of methodologies for CO2 storage capacity estimation of saline aquifers", Fuel, vol. 93, Mar. 2012, pp. 13-27 (Year: 2012).*
First Office Action in Chinese Application No. 202311322947.X mailed on Nov. 23, 2023, 12 pages.
Decision to Grant a Patent in Chinese Application No. 202311322947.X mailed on Dec. 22, 2023, 3 pages.
Mohsen Abbaszadeh et al., Investigating the Impact of Reservoir Properties and Injection Parameters on Carbon Dioxide Dissolution in Saline Aquifers, Fluids, 2018, 16 pages.

(Continued)

*Primary Examiner* — Yoshihisa Ishizuka
(74) *Attorney, Agent, or Firm* — METIS IP LLC

(57) ABSTRACT

The present disclosure provides a method for assessing GCS capacity. The method includes: determining scores of a plurality of geologic indicators of a target region belonging to a target type of geologic body for the GCS; and determining an assessment result of the GCS capacity of the (Continued)

target region based on the scores of the plurality of geologic indicators and weights of the plurality of geologic indicators.

5 Claims, 6 Drawing Sheets

(56) References Cited

OTHER PUBLICATIONS

Juan Alcalde et al., A Criteria-Driven Approach to the CO2 Storage Site Selection of East Mey for the Acorn Project in the North Sea, Marine and Petroleum Geology, 2021, 14 pages.

Stefan Bachu, Screening and Ranking of Sedimentary Basins for Sequestration of CO2 in Geological Media in Response to Climate Change, Environmental Geology, 44(3): 277-289, 2003.

Víctor Carlotto et al., A Multi-Criteria Approach to the Selection of Geological Storage of CO2 sites in Peru, International Journal of Greenhouse Gas Control, 2021, 12 pages.

Muhammet Deveci et al., Fuzzy Multi-Vriteria Decision Making for Carbon Dioxide Geological Storage in Turkey, Journal of Natural Gas Science and Engineering, 2015, 14 pages.

Irem Firtina Ertis, Application of Multi-Criteria Decision Making for Geological Carbon Dioxide Storage Area in Turkey, Anadolu University Journal of Science and Technology A—Applied Sciences and Engineering, 19(2): 536-545, 2018.

He, Hujun et al., Evaluating the CO2 Geological Storage Suitability of Coal-Bearing Sedimentary Basins in China, Environ Monit Assess, 2020, 13 pages.

Chia-Wei Hsu et al., Site Selection for Carbon Dioxide Geological Storage Using Analytic Network Process, Separation and Purification Technology, 94: 146-153, 2012.

Jordan Kearns et al., Developing a Consistent Database for Regional Geologic CO2 Storage Capacity Worldwide, Energy Procedia, 114: 4697-4709, 2017.

J. H. Lee et al., A Simulation of a Trap Mechanism for the Sequestration of CO2 into Gorae V Aquifer, Korea, Energy Sources, Part A: Recovery, Utilization, and Environmental Effects, 32: 796-808, 2010.

Liu, Baozhong et al., CO2 Modeling in a Deep Saline Aquifer: A Predictive Uncertainty Analysis Using Design of Experiment, Environmental Science & Technology, 45(8): 3504-3510, 2011.

Hung Bo Thanh et al., Application of Machine Learning to Predict CO2 Trapping Performance in Deep Saline Aquifers, Energy, 2022, 14 pages.

Guo, Jianqiang et al., Suitability Evaluation and Demonstration Project of CO2 Geological Storage in China, Geological Publishing House, 2015, 4 pages.

\* cited by examiner

400

For each of a plurality of geologic indicators, obtaining a survey value of the geologic indicator of a target region — 410

For each of the geologic indicators, determining a score of the geologic indicator based on the survey value of the geologic indicator — 420

FIG. 4

METHODS AND SYSTEMS FOR ASSESSING GEOLOGICAL CARBON DIOXIDE STORAGE CAPACITY

CROSS-REFERENCE TO RELATED APPLICATIONS

This application claims priority to Chinese Patent Application No. 202311322947.X, filed on Oct. 13, 2023, the content of which is hereby incorporated by reference.

TECHNICAL FIELD

The present disclosure relates to the field of geological carbon dioxide storage (GCS), and in particular, to methods and systems for assessing GCS capacity.

BACKGROUND

Selecting a suitable site for GCS is a key link in a process of carbon capture, utilization, and storage (CCUS). It is desirable to develop effective systems and methods for assessing GCS capacity and selecting a suitable site for GCS.

SUMMARY

According to one embodiment of the present disclosure, a process for assessing GCS capacity is provided. The method includes: determining scores of a plurality of geologic indicators of a target region, wherein the target region belongs to a target type of geologic body for GCS; and determining an assessment result of the GCS capacity of the target region based on the scores of the geologic indicators and weights of the geologic indicators. The geologic indicators and the weights of the geologic indicators are determined by: determining a plurality of training samples corresponding to the target type of the geologic body, each training sample including sample scores of a plurality of candidate geologic indicators; for each of the plurality of training samples, determining the GCS capacity corresponding to the training sample based on a storage capacity determination model corresponding to the target type of the geologic body; generating a target model for GCS capacity prediction based on each of the plurality of training samples and the GCS capacity corresponding to each of the plurality of training samples using a machine learning algorithm; determining a weight of each candidate geologic indicator based on the target model; and determining the geologic indicators from the plurality of candidate geologic indicators based on the weight of each candidate geologic indicator.

According to one of the embodiments of the present disclosure, a system for assessing the GCS capacity is provided. The system includes a score determination module, an assessment module, and an indicator and weight determination module. The score determination module is configured to determine scores of the geologic indicators of the target region, wherein the target region belongs to the target type of geologic body for GCS. The assessment module is configured to determine an assessment result of the GCS capacity of the target region based on the scores of the geologic indicators and the weights of the geologic indicators. The indicator and weight determination module is configured to determine the geologic indicators and the weights of the geologic indicators by: determining the plurality of training samples corresponding to the target type of the geologic body, each training sample includes the sample scores of the plurality of candidate geologic indicators; for each of the plurality of training samples, determining the GCS capacity corresponding to the training sample based on the storage capacity determination model corresponding to the target type of the geologic body; generating the target model for GCS capacity prediction based on each of the plurality of training samples and the GCS capacity corresponding to each of the plurality of training samples using the machine learning algorithm; determining the weight of each candidate geologic indicator based on the target model; and determining the geologic indicators from the plurality of candidate geologic indicators based on the weight of each candidate geologic indicator.

According to one of the embodiments of the present disclosure, a device for assessing the GCS capacity is provided. The device includes a processor, and the processor is configured to perform the methods for assessing the GCS capacity disclosed herein.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 4 is a flowchart illustrating an exemplary process for determining scores of geologic indicators according to some embodiments of the present disclosure;

DETAILED DESCRIPTION

Figure 1:
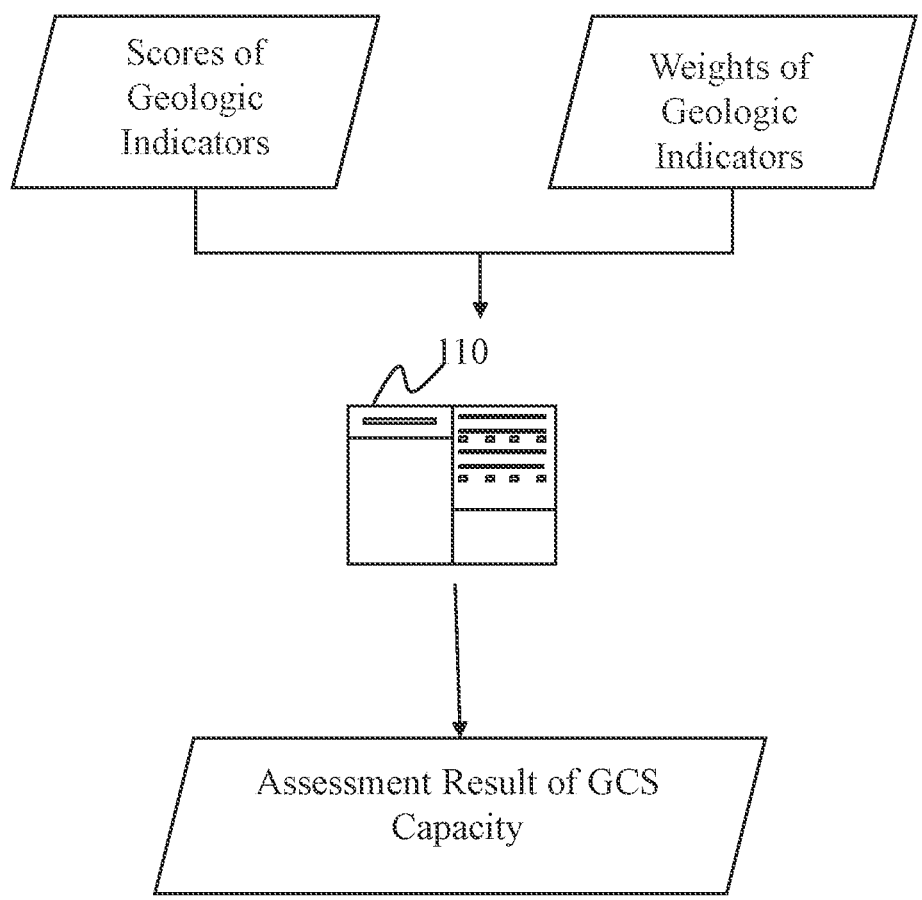
FIG. 1 is a schematic diagram illustrating an exemplary system for assessing GCS capacity according to some embodiments of the present disclosure.

In order to illustrate the technical solutions related to the embodiments of the present disclosure, a brief introduction of the drawings referred to in the description of the embodiments is provided below. Obviously, the drawings described below are only some examples or embodiments of the present disclosure. Those skilled in the art, without further creative efforts, may apply the present disclosure to other similar scenarios according to these drawings. Unless apparent from the locale or otherwise stated, like reference numerals represent similar structures or operations throughout the several views of the drawings.

It will be understood that the term "system," "device," "unit," and/or "module" used herein are one method to distinguish different components, elements, parts, sections, or assembly of different levels in ascending order. However, the terms may be displaced by another expression if they achieve the same purpose.

As used in the disclosure and the appended claims, the singular forms "a," "an," and/or "the" may include plural forms unless the content clearly indicates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may further include other steps or elements.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

A conventional process of selecting a GCS site involves a lot of human intervention. For example, candidate storage sites are selected, geologic indicators affecting the GCS capacity are determined, a scoring guideline table of the geologic indicators is constructed, weights of the geologic indicators are determined through expert scoring, pairwise comparison, hierarchical analysis, etc., and then the score of each geologic indicator is determined for each candidate storage site to obtain a ranking result of the candidate storage sites and select a suitable storage site from the candidate storage sites.

However, the weights of the geologic indicators are determined by experts according to personal experience, which is susceptible to human error or subjectivity and lacks objectivity and physical basis. In addition, different types of geologic bodies have different principles of the GCS, and the existing methods for assessing storage capacity rarely take into account actual geologic conditions, physical and chemical effects in the process of storage, and the mechanisms of storage of different types of geologic bodies. In addition, the existing scoring guideline table assigns a same score to the geologic indicators located in the same interval, which is not quantitatively refined enough to reflect differences in the geologic indicators within the interval.

Therefore, methods and systems for assessing the GCS capacity are provided, and different indicator-weight systems are proposed for different types of geologic bodies in a targeted manner so that the most suitable storage site can be identified by quantifying and ranking the storage capacities of candidate storage sites.

FIG. 1 is a schematic diagram illustrating an exemplary system for assessing GCS capacity according to some embodiments of the present disclosure.

As shown in FIG. 1, a system for assessing GCS capacity 100 (hereinafter referred to as an assessment system 100) may include a processing device 110 for assessing GCS capacity of a target region based on scores of a plurality of geologic indicators of the target region and weights of the geologic indicators to obtain an assessment result of the GCS capacity of the target region.

In some embodiments, the processing device 110 may include a central processing unit (CPU), an application-specific integrated circuit (ASIC), an application-specific instruction set processor (ASIP), an graphic processing unit (GPU), a physical processing unit (PPU), a digital signal processor (DSP), a field programmable gate array (FPGA), a programmable logic device (PLD), a controller, microcontroller unit, a reduced instruction set computer (RISC), a microprocessor, etc., or any combination thereof. In some embodiments, the processing device 110 may be a single server or a server group. The server group may be centralized or distributed (e.g., the processing device 110 may be a distributed system). In some embodiments, the processing device 110 may be local or remote. In some embodiments, processing device 110 may be implemented on a cloud platform. Merely by way of example, the cloud platform may include a private cloud, a public cloud, a hybrid cloud, a community cloud, a distributed cloud, an on-premises cloud, a multi-tiered cloud, etc. or any combination thereof.

In some embodiments, other components may be included in the assessment system 100, for example, a survey device, a storage device, a network, etc. The survey device includes, but is not limited to, various types of devices such as a geologic survey device, an environmental monitoring device, etc. For example, the survey device may include a geologic radar, a core permeability meter, a manometer, etc.

The storage device may be configured to store data, instructions, and/or any other information. In some embodiments, the storage device may store the data and/or information obtained from other components of the assessment system 100 (e.g., the processing device 110, the survey device). In some embodiments, the storage device may store the data and/or instructions used by the processing device 110 to execute or use to accomplish an exemplary method described in the present disclosure. In some embodiments, the storage device may be a portion of the processing device 110. In some embodiments, the storage device may include a mass memory, a removable memory, etc., or any combination thereof.

A network may facilitate or realize an exchange of the information and/or data between components in the assessment system 100. The network may include a wired network and/or a wireless network. In some embodiments, the network may include one or more network access points. For example, the network may include one or more wired network access points or wireless network access points. In some embodiments, the network may be a peer-to-peer network, a shared network, a hub-and-spoke network, or any combination thereof.

It should be noted that the assessment system 100 is merely provided for purpose of illustration and is not intended to limit the scope of the present disclosure. For those skilled in the art, a variety of amendments or variations may be made based on the description herein. For example, the assessment system 100 may further include a terminal device for displaying an assessment result of the GCS capacity of the target region to a user. However, these amendments and variations will not depart from the scope of the present disclosure.

Figure 2:
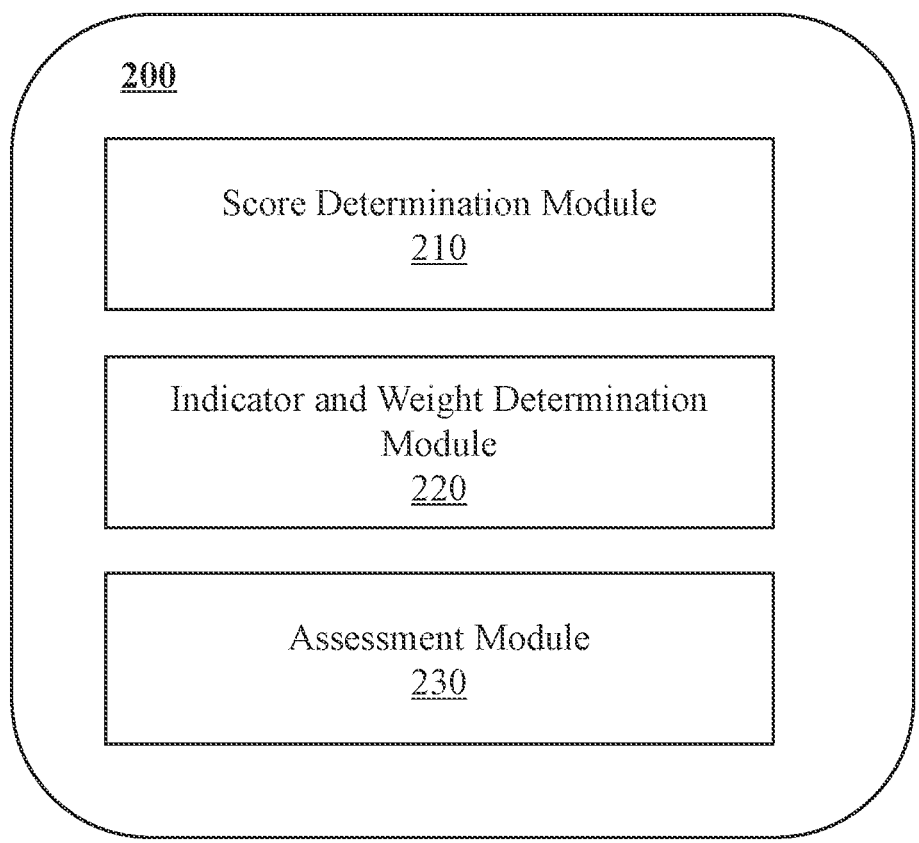
FIG. 2 is a block diagram illustrating an exemplary system for assessing GCS capacity according to some embodiments of the present disclosure.

FIG. 2 is a block diagram illustrating an exemplary system for assessing GCS capacity according to some embodiments of the present disclosure. As shown in FIG. 2, a system for assessing GCS capacity 200 (hereinafter referred to as the assessment system 200) may include a score determination module 210, an indicator and weight determination module 220, and an assessment module 230. In some embodiments, the modules may be implemented by the processing device 110.

The score determination module 210 may be configured to determine scores of a plurality of geologic indicators of a target region, wherein the target region belongs to a target type of geologic body for GCS.

In some embodiments, the target type includes one of a deep saline aquifer, a depleted oil reservoir, and a depleted gas reservoir.

In some embodiments, for each geologic indicator, the score determination module 210 may further be configured to obtain a survey value of the geologic indicator of the target region; and determine a score of the geologic indicator based on the survey value of the geologic indicator.

In some embodiments, the geologic indicators of the target region include a target geologic indicator, and the survey value of the target geologic indicator is expressed as a spatial function. The score determination module 210 may be further configured to divide the target region into a plurality of classes of sub-regions based on the survey value of the target geologic indicator; determine a score of the target geologic indicator of each class of sub-regions; determine a score of the target geologic indicator of the target region based on the score of the target geologic indicator of each class of sub-regions and a second weight of each class of sub-regions. The second weight of each class of sub-regions is related to a ratio of the size of the class of sub-regions to the size of the target region.

In some embodiments, for at least one of the geologic indicators, the score of the geologic indicator is linearly correlated with its survey value within a target range.

In some embodiments, the indicator and weight determination module 220 may be configured to determine a plurality of training samples corresponding to the target type of the geologic body, each training sample including sample scores of the plurality of candidate geologic indicators; for each of the plurality of training samples, determine the GCS capacity corresponding to the training sample based on a storage capacity determination model corresponding to the target type of the geologic body; generate a target model for GCS capacity prediction based on each of the plurality of training samples and the GCS capacity corresponding to each of the plurality of training samples using a machine learning algorithm; determine a weight of each candidate geologic indicator based on the target model; and determine the geologic indicators from the plurality of candidate geologic indicators based on the weight of each candidate geologic indicator.

In some embodiments, the storage capacity determination model includes a flow term, a diffusion term, a source-sink term, and a cumulative term.

In some embodiments, the indicator and weight determination module 220 may further be configured to determine value ranges of the plurality of candidate geologic indicators of the target type of the geologic body; and determine the plurality of training samples based on the value ranges of the plurality of candidate geologic indicators, wherein each of the plurality of training samples includes a sample value of each candidate geologic indicator. The sample value of each candidate geologic indicator is within the corresponding value range.

In some embodiments, the indicator and weight determination module 220 may further be configured to: for each of the plurality of training samples, determine a predicted GCS capacity for the training sample based on the sample scores of the training sample and the target model; determine a correlation coefficient between each candidate geologic indicator and the GCS capacity based on the sample scores of the plurality of candidate geologic indicators and the predicted GCS capacity of each training sample; and determine the weight of each geologic indicator based on the correlation coefficient between each candidate geologic indicator and the GCS capacity.

In some embodiments, the assessment module 230 may be configured to determine an assessment result of the GCS capacity of the target region based on the scores of the geologic indicators and the weights of the geologic indicators.

In some embodiments, the assessment module 230 may further be configured to determine, for each class of sub-regions, determine an assessment result of the GCS capacity of the class of sub-regions based on the scores of the geologic indicators and the weights of the geologic indicators of the class of sub-regions; and determine the assessment result of the target region based on the assessment result of each class of sub-regions.

In some embodiments, the assessment module 230 may further be configured to determine a decision matrix based on the scores of the geologic indicators; determine a weighted decision matrix based on the decision matrix and the weights of the geologic indicators; and determine the assessment result of the GCS capacity of the target region by solving the weighted decision matrix.

It should be noted that the functions of the modules described above may be realized by the assessment system upon an execution of computer instructions (program codes). In some embodiments, the assessment system may include one or more processing devices (e.g., the processing device 110 shown in FIG. 1). In some embodiments, the assessment system may include a storage device (e.g., a memory) or be connected to an external storage device. The storage device may store instructions for performing the process for assessing the GCS capacity disclosed in the present disclosure. When the processing device reads these instructions, the processing device may be configured to perform the process for assessing the GCS capacity.

It should be noted that the above description of the assessment system and its modules is merely provided for illustration purposes and does not limit the present disclosure to the scope of the embodiments. It should be understood that for those skilled in the art, after understanding a principle of the system, it may be possible to make any combination of modules or form a sub-system to connect with other modules without departing from the principle. For example, one or more of the modules described above may be different modules in different systems, or one module may realize the functions of two or more of the modules described above. For example, various modules may share one storage module, or various modules may have their storage modules. However, those variations and modifications do not depart from the scope of the present disclosure.

Figure 3:
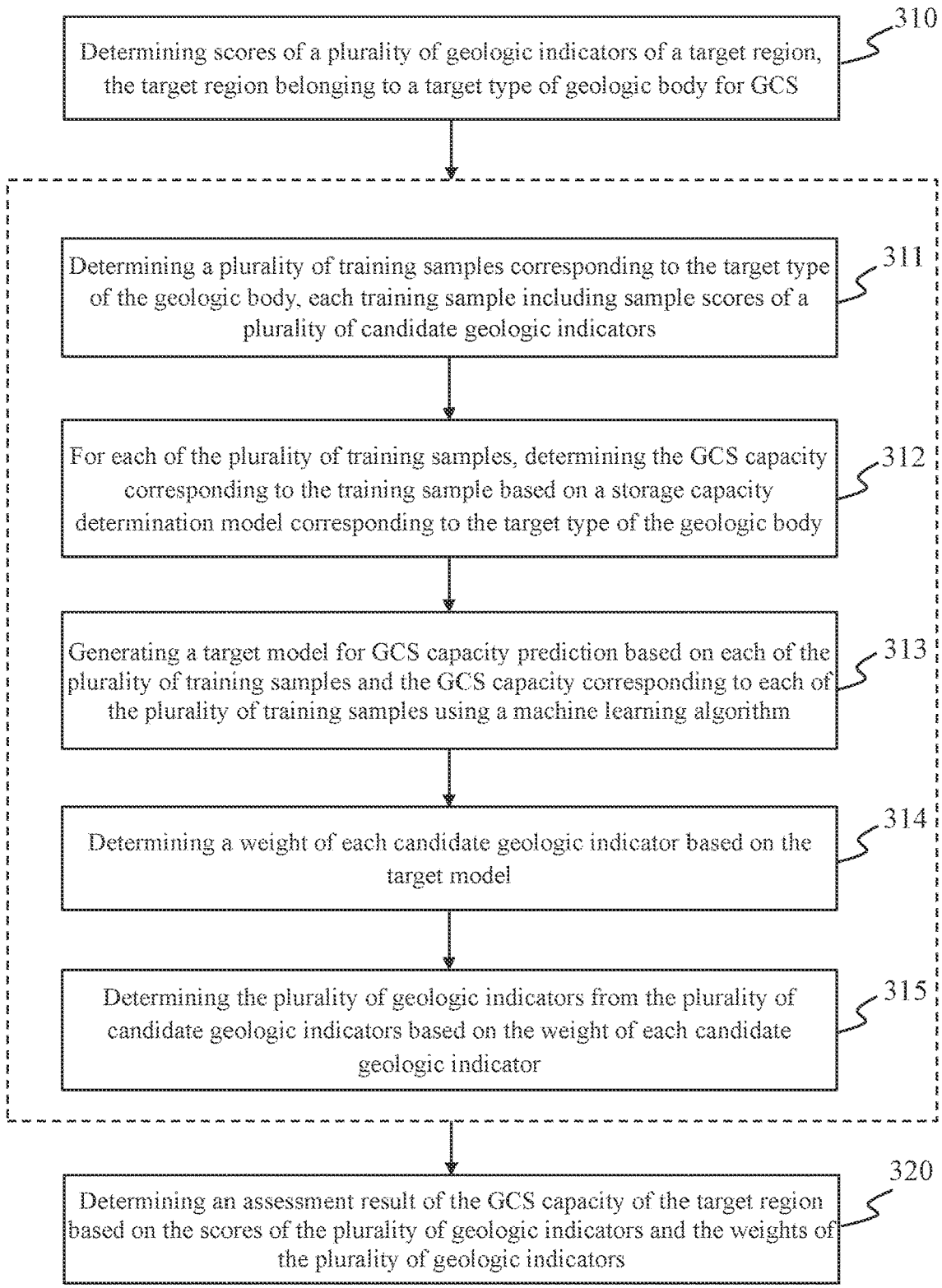
FIG. 3 is a flowchart illustrating an exemplary process for assessing GCS capacity according to some embodiments of the present disclosure.

FIG. 3 is a flowchart illustrating an exemplary process for assessing GCS capacity according to some embodiments of the present disclosure. Carbon dioxide geologic storage is a technique for storing carbon dioxide by injecting carbon dioxide into a geologic body at a preset underground depth range (e.g., from 800 m to 3,500 m). The GCS capacity may measure how much carbon dioxide the geologic body can store.

In some embodiments, the process 300 may be performed by an assessment system. As shown in FIG. 3, the process 300 includes the following operations.

In 310, scores of a plurality of geologic indicators of a target region are determined, wherein the target region belongs to a target type of geologic body for GCS. In some embodiments, operation 310 may be performed by the score determination module 210.

The target region is a candidate geologic body for GCS, and the GCS capacity of the target region needs to be assessed. The geologic body for GCS refers to a geologic structure for storing carbon dioxide and may include a variety of different types of geologic bodies. For brevity, the geologic body for GCS is referred to as the geologic body. For example, the types of geologic bodies may include the deep saline aquifer, the depleted oil reservoir, the depleted gas reservoir, the deep unmineable coal seam, the basic-ultrabasic rock, etc. The target type refers to a type of geologic body to which the target region belongs. For example, the target type includes one of the deep saline aquifer, the depleted oil reservoir, and the depleted gas reservoir.

The interactions between formation fluids and carbon dioxide (e.g., the trapping mechanism of carbon dioxide) within different types of geologic bodies are different, and the GCS capacities of different types of geologic bodies are different. A high concentration of salts is dissolved in the formation water of the deep saline aquifer (salinity can be higher than 10 g/L), which is unsuitable for production and domestic use. With a wide distribution and a large area, the deep saline aquifer may store carbon dioxide effectively for a long time and has large storage capacity. The depleted oil reservoir and the depleted gas reservoir are relatively similar, which refer to a geologic space formed after a depletion of oil/gas, and the geologic space includes reservoirs, caprocks, and barriers that prevent oil and gas from continuing to migrate and facilitate oil and gas accumulation, and the geologic space has a large capacity of storing carbon dioxide. Therefore, the depleted oil reservoir and the depleted gas reservoir are also geologic bodies suitable for GCS.

The geologic indicators are parameters or indicators used to measure the GCS capacity of the target region. In some embodiments, the geologic indicators may be determined based on priori knowledge (e.g., practical engineering experience, etc.). For example, the geologic indicators may include a reservoir area, a reservoir thickness, a formation temperature gradient, a formation pressure, a porosity, a permeability, a fracture pressure coefficient, a lithology of a reservoir rock, an effective reservoir aspect ratio, a formation water mineralization, a geothermal heat flux value, a surface temperature, or any combination thereof, and any other indicators that may affect the GCS capacity. The fracture pressure coefficient refers to a ratio of a fracture pressure to a formation pressure.

In some embodiments, the geologic indicators include the following seven indicators: a reservoir area, a reservoir thickness, a formation temperature gradient, a formation pressure, a porosity, a permeability, and a fracture pressure coefficient. In some embodiments, the geologic indicators are selected from a plurality of candidate geologic indicators and have a large impact (e.g., a weight being greater than a threshold value) on the GCS capacity. Descriptions regarding the selection process of the geologic indicators may be found in operations 311-315. In some embodiments, operations 311-315 may be performed by the indicator and weight determination module 220.

The score of a geologic indicator may be determined based on the value (e.g., a survey value, a predicted value) of the geologic indicator of the target region, which may reflect whether the value of the geologic indicator of the target region is favorable for GCS. Taking the reservoir area as an example, the score of the reservoir area may be determined based on the survey value of the reservoir area of the target region. It should be understood that the larger the reservoir area, the larger the score corresponding to the reservoir area, and the greater the GCS capacity of the target region.

In some embodiments, the assessment system may determine the scores of the geologic indicators based on the survey value of each geologic indicator of the target region. More descriptions of determining the scores of the geologic indicators may be found in FIG. 4 and the related descriptions thereof.

In some embodiments, the assessment system may determine the assessment result of the GCS capacity based on the scores of the geologic indicators. For example, the assessment result may be determined based on the sum of the scores of the geologic indicators. In some embodiments, each geologic indicator of the geologic indicators may have a different weight, so that the assessment result of the GCS capacity is determined based on an actual condition of the target region (e.g., the type of geologic body).

The weight of a geologic indicator may indicate an influence of the geologic indicator on the assessment result of the GCS capacity. The greater the weight, the greater the influence of the geologic indicator on the assessment result.

In some embodiments, the geologic indicators and their weights are predetermined, and the assessment system may determine the assessment result directly based on the scores and the predetermined weights of the geologic indicators. In some embodiments, the assessment system may determine the geologic indicators and their weights based on operations 311 to 315 as follows.

In 311, a plurality of training samples corresponding to the target type of the geologic body are determined. Each training sample includes sample scores of a plurality of candidate geologic indicators.

The candidate geologic indicators include indicators that affect the GCS capacity of the target type of the geologic body. The assessment system may analyze the candidate geologic indicators and select indicators that have a relatively great impact on the GCS capacity of the target type of the geologic body as the geologic indicators as described in connection with operation 310.

Each training sample may correspond to a sample region belonging to the target type of the geologic body for GCS, and include the sample scores of the candidate geologic indicators of the sample region. The sample region may be a real region or a simulated region generated by data simulation. The sample score of a candidate geologic indicator of the sample region may be determined based on a value (e.g., a survey value or a simulated value) of the candidate geologic indicator. The sample scores of the candidate geologic indicators are determined in a manner similar as how the scores of the geologic indicators are determined as described above and will not be repeated herein.

In some embodiments, the assessment system may determine value ranges of the plurality of candidate geologic indicators of the target type of the geologic body; and determine the plurality of training samples based on the value ranges of the plurality of candidate geologic indicators. Each of the plurality of training samples includes the sample value of each candidate geologic indicator, and the sample value of each candidate geologic indicator is within the corresponding value range.

The value range of a candidate geologic indicator refers to valid value range of the candidate geologic indicator of the target type of the geologic body. For example, for the geologic body of the deep saline aquifer, if its formation temperature is typically greater than A and less than B, a range A-B may be used as a value range of the formation temperature. In some embodiments, the value range of the candidate geologic indicator may be determined based on the priori knowledge. For example, the value range of the candidate geologic indicator is determined based on research data from third-party authorities or literature, etc.

In some embodiments, for each of the candidate geologic indicators, the assessment system may sample within the value range of the candidate geologic indicator to obtain a sample value for the candidate geologic indicator. A combination of the sample values of the plurality of candidate geologic indicators may be used as a training sample. In such cases, the sample region corresponding to the training sample is a simulated region obtained based on data simulation, and the sample values of the candidate geologic indicators of the simulated region are simulation values obtained based on data sampling.

In some embodiments of the present disclosure, the training samples are determined for different types of geologic bodies, which may provide an effective data basis for a subsequent construction of different types of storage capacity determination models in a targeted manner. In addition, by determining the value ranges of the candidate geologic indicators, the influence of the different types of geologic bodies on the GCS may be taken into consideration in a refined and realistic manner, thereby making the subsequent analysis result of the storage capacity determination model more accurate.

In some embodiments, for a candidate geologic indicator, the assessment system may use a Latin hypercube sampling (LHS) method to sample within its corresponding value range to generate a preset count (e.g., 200) of samples, determine a portion of the samples (e.g., 160 or 80% of the samples) as a sample training set, and determine the rest of the samples as a test set.

In 312, for each of the plurality of training samples, the GCS capacity corresponding to the training sample is determined based on a storage capacity determination model corresponding to the target type of the geologic body.

The storage capacity determination model refers to a numerical model for determining the GCS capacity, which may be generated based on modeling or various types of analytical algorithms. In some embodiments, a storage capacity determination model may refer to a numerical determination model for predicting the GCS capacity that is constructed based on the trapping mechanisms of carbon dioxide (e.g., structural and stratigraphic trapping, residual carbon dioxide trapping, solubility trapping, and mineral trapping) of the target type of the geologic body. The storage capacity determination model may be used to analyze the flow behavior of different components (e.g., carbon dioxide, water) with different phases (e.g., water phase, gas phase) in the target type of the geologic body.

In some embodiments, the storage capacity determination model may include a flow term, a diffusion term, a source-sink term, and a cumulative term. The flow term relates to a gas phase, a water phase and an oil phase flowing in the geologic body; the diffusion term relates to diffusion of components within and between a gas phase, a water phase, and an oil phase; the source-sink term relates to the injection of carbon dioxide; and the cumulative term relates to the GCS capacity; and the cumulative term is equal to the sum of the flow term, the diffusion term, and the source-sink term.

The assessment system may construct capacity determination models for different types of geologic bodies. For example, a storage capacity determination model corresponding to the deep saline aquifer, a storage capacity determination model corresponding to the depleted oil reservoir, and a storage capacity determination model corresponding to the depleted gas reservoir may be constructed.

In some embodiments, the assessment system may construct a storage capacity determination model corresponding to the deep saline aquifer based on Equation (1a) as shown below:

$$\frac{\partial}{\partial t}[\varphi(C_{i,g}\rho_g S_g + C_{i,w}\rho_w S_w)] = -\nabla[(C_{i,g}\rho_g v_g + C_{i,w}\rho_w v_w)] + \nabla(D_{i,g}\rho_g \nabla C_{i,g} + D_{i,w}\rho_w \nabla C_{i,w}) + q_i, \quad \text{Equation (1a)}$$

where in Equation (1a), a subscript i denotes a component (carbon dioxide, water, or salt); the subscripts g and w denote the gas phase and the water phase, respectively; t denotes the time; $\varphi$ denotes the porosity, and C denotes a mass fraction, $C_{i,g}$ and $C_{i,w}$ denote the mass fraction of the component i in the gas phase and the water phase, respectively; $\rho$ denotes density; S denotes saturation, $S_g$ denotes saturation of the gas phase, and $S_w$ denotes saturation of the water phase; D denotes a diffusion coefficient, $D_{i,g}$ and $D_{i,w}$ denote the diffusion coefficient of component i in the gas phase and the water phase, respectively; $q_i$ refers to a source-sink term, which denotes an amount of carbon dioxide injected into the target region; v denotes a flow rate, and $v_g$ denotes the flow rate of the gas phase, and $v_w$ denotes the flow rate of the water phase.

$C_{i,g}$ and $C_{i,w}$, $D_{i,g}$ and $D_{i,w}$ are parameters that are merely related to material composition, temperature (i.e., a geothermal gradient), and pressure (i.e., a formation pressure). Under fixed temperature and pressure, $C_{i,g}$, $C_{i,w}$, $D_{i,g}$ and $D_{i,w}$ are constant values. The values of $C_{i,g}$, $C_{i,w}$, $D_{i,g}$ and $D_{i,w}$ under fixed temperature and pressure may be determined based on existing literature or models. The density $\rho$ may be determined based on the composition, the formation temperature gradient, and the formation pressure. The porosity $\varphi$ may be determined directly according to the geologic indicator porosity.

In Equation (1a), $-\nabla[(C_{i,g}\rho_g v_g + C_{i,w}\rho_w v_w)]$ is the flow term, $\nabla(D_{i,g}\rho_g \nabla C_{i,g} + D_{i,w}\rho_w \nabla C_{i,w})$ is the diffusion term, and $$\frac{\partial}{\partial t}[\varphi(C_{i,g}\rho_g S_g + C_{i,w}\rho_w S_w)]$$

is the cumulative term.

The flow velocity v may be obtained by using Darcy's Equation (1b) and Equation (1c) considering an effect of gravity as below:

$$v_g = -\frac{KK_{rg}}{\mu_g}\nabla(p_g - \rho_g g D_Z), \quad \text{Equation (1b)}$$

$$v_w = -\frac{KK_{rw}}{\mu_w}\nabla(p_w - \rho_w g D_Z), \quad \text{Equation (1c)}$$

where in Equation (1b) and Equation (1c), K denotes an absolute permeability of the formation; $K_{rg}$ and $K_{rw}$ are relative permeabilities of the gas phase and the water phase, respectively; $\mu$ is a fluid viscosity; $p_g$ and $p_w$ are the pressures of the gas phase and the water phases, respectively; g is a gravitational acceleration; $D_Z$ is a longitudinal depth. The absolute permeability K may be determined according to a geologic indicator permeability. $p_g$ and $p_w$ are related to the formation pressure and the formation fracture pressure coefficient, which cannot exceed a product of the formation fracture pressure coefficient and the formation pressure.

In some embodiments, the assessment system may solve the storage capacity determination model corresponding to the deep saline aquifer to determine the cumulative term (i.e., the GCS capacity) with auxiliary Equations (1d), (1e), and (1f) as shown below.

$$S_g + S_w = 1, \quad \text{Equation (1d)}$$

$$\Sigma C_{i,g} = 1, \quad \text{Equation (1e)}$$

$$\Sigma C_{i,w} = 1. \quad \text{Equation (1f)}$$

In some embodiments, similar to the storage capacity determination model of the deep saline aquifer, the assessment system may construct the storage capacity determination model of the depleted oil reservoir based on Equation (2a) as shown below.

$$\frac{\partial}{\partial t}[\varphi(C_{i,g}\rho_g S_g + C_{i,w}\rho_w S_w + C_{i,o}\rho_o S_o)] = \quad \text{Equation (2a)}$$
$$-\nabla[(C_{i,g}\rho_g v_g + C_{i,w}\rho_w v_w + C_{i,o}\rho_o v_o)] +$$
$$\nabla(D_{i,g}\rho_g \nabla C_{i,g} + D_{i,w}\rho_w \nabla C_{i,w} + D_{i,o}\rho_o \nabla C_{i,o}) + q_i,$$

where in Equation (2a), a subscript i denotes a component (carbon dioxide, water, or oil); a subscript o denotes the oil phase; and the rest of the physical quantities are consistent with those in Equation (1a). The flow rates $v_g$, $v_w$ and $v_o$ may be obtained by using Equation (2b), Equation (2c), and Equation (2d) as shown below:

$$v_g = -\frac{KK_{rg}}{\mu_g}\nabla(p_g - \rho_g g D_Z), \quad \text{Equation (2b)}$$

$$v_w = -\frac{KK_{rw}}{\mu_w}\nabla(p_w - \rho_w g D_Z), \quad \text{Equation (2c)}$$

$$v_o = -\frac{KK_{ro}}{\mu_o}\nabla(p_o - \rho_o g D_Z), \quad \text{Equation (2d)}$$

The assessment system may further solve the storage capacity determination model of depleted oil reservoir with auxiliary Equations (2e), (2f), (2g), and (2h) as shown below to determine the cumulative term $$\frac{\partial}{\partial t}[\varphi(C_{i,g}\rho_g S_g + C_{i,w}\rho_w S_w + C_{i,o}\rho_o S_o)]:$$

$$S_g + S_w + S_o = 1, \quad \text{Equation (2e)}$$

$$\Sigma C_{i,g} = 1, \quad \text{Equation (2f)}$$

$$\Sigma C_{i,w} = 1, \quad \text{Equation (2g)}$$

$$\Sigma C_{i,o} = 1, \quad \text{Equation (2h)}$$

In some embodiments, the assessment system may generate a storage capacity determination model of the depleted gas reservoir based on Equation (3a) as shown below:

$$\frac{\partial}{\partial t}[\varphi(C_{i,g}\rho_g S_g + C_{i,w}\rho_w S_w)] = -\nabla[(C_{i,g}\rho_g v_g + C_{i,w}\rho_w v_w)] + \quad \text{Equation (3a)}$$
$$\nabla(D_{i,g}\rho_g \nabla C_{i,g} + D_{i,w}\rho_w \nabla C_{i,w}) + q_i,$$

where a subscript i in Equation (3a) denotes the component (carbon dioxide, water, or natural gas), and the rest of the physical quantities are consistent with those in Equation (1a). Flow rates $v_g$, $v_w$ may be obtained using Equation (3b) and Equation (3c) as shown below:

$$v_g = -\frac{KK_{rg}}{\mu_g}\nabla(p_g - \rho_g g D_Z), \quad \text{Equation (3b)}$$

$$v_w = -\frac{KK_{rw}}{\mu_w}\nabla(p_w - \rho_w g D_Z), \quad \text{Equation (3c)}$$

where the physical quantities in Equation (3b) and Equation (3c) are consistent with those in Equation (1b) and Equation (1c).

In some embodiments, the assessment system may solve the storage capacity determination model with auxiliary Equation (3d), Equation (3e), and Equation (3f) as shown below, thereby determining the cumulative term $$\frac{\partial}{\partial t}[\varphi(C_{i,g}\rho_g S_g + C_{i,w}\rho_w S_w)].$$

$$S_g + S_w = 1, \quad \text{Equation (3d)}$$

$$\Sigma C_{i,g} = 1, \quad \text{Equation (3e)}$$

$$\Sigma C_{i,w} = 1, \quad \text{Equation (3f)}$$

It should be understood that the assessment system may determine the GCS capacity corresponding to a training sample based on the storage capacity determination model corresponding to the target type (e.g., the storage capacity determination model of deep saline aquifer, the storage capacity determination model of depleted oil reservoir, or the storage capacity determination model of depleted gas reservoir), which may be served as a training label for training the target model.

In some embodiments of the present disclosure, the accuracy of the predicted GCS capacity may be improved by separately constructing storage capacity determination models for different geologic bodies, thereby improving the accuracy of the target model and the accuracy of the weights of the geologic indicators subsequently determined based on the predicted GCS capacity.

In 313, the target model for GCS capacity prediction is generated based on each of the plurality of training samples and the GCS capacity corresponding to each of the plurality of training samples using a machine learning algorithm.

The target model is a trained machine learning model for predicting the GCS capacity of a region. In some embodiments, the target model may include a Gaussian Process Regression (GPR) model, a Support Vector Machine (SVM) model, etc.

In some embodiments, an initial model may be trained iteratively to obtain the target model. For each training sample, sample scores of the candidate geologic indicators of the training sample may be used as an input of the initial model, and the initial model may output the predicted GCS capacity corresponding to the training sample. A value of a loss function may be determined based on the GCS capacity corresponding to each training sample and the GCS capacity output by the initial model. The parameters of the initial model may be iteratively updated based on the value of the loss function until the training termination condition is met (e.g., the loss function converges, a specific count of iterations has been performed, etc.). An updated initial model may be used as the target model.

In some embodiments, the target model may be assessed using a test set to determine whether it is a suitable model for use in storage assessment. For example, the target model may be assessed based on Equation (4a) and Equation (4b) as shown below:

$$R^2 = 1 - \frac{\sum_{i=1}^{N}(Y_{i,sam} - Y_{i,pred})^2}{\sum_{i=1}^{N}(Y_{i,sam} - \bar{Y}_{i,sam})^2},$$ Equation (4a)

$$RMSE = \sqrt{\frac{1}{N} \times \sum_{i=1}^{N}(Y_{i,sam} - Y_{i,pred})^2},$$ Equation (4b)

where $Y_{i,sam}$, $Y_{i,pred}$ and $\bar{Y}_{i,sam}$ are the GCS capacity determined by the storage capacity determination model, the GCS capacity predicted by the target model, and the average of the GCS capacity determined by the storage capacity determination model, respectively.

In 314, the weight of each candidate geologic indicator is determined based on the target model.

In some embodiments, the assessment system may determine a correlation coefficient for each of the candidate geologic indicators and the GCS capacity. The correlation coefficient of a candidate geologic indicator may indicate a degree of correlation between the candidate geologic indicator and the GCS capacity, which may be used to determine the weight of the candidate geologic indicator.

In some embodiments, for each training sample, the assessment system may determine the predicted GCS capacity for the training sample based on the sample scores of the training sample and the target model; determine the correlation coefficient between each candidate geologic indicator and the GCS capacity based on the sample scores of the plurality of candidate geologic indicators and the predicted GCS capacity of each training sample; and determine the weight of each candidate geologic indicator based on the correlation coefficient between each candidate geologic indicator and the GCS capacity. More descriptions of determining the weights of the candidate geologic indicators may be found in FIG. 6 and the related descriptions.

In 315, the geologic indicators are determined from the plurality of candidate geologic indicators based on the weight of each candidate geologic indicator.

In some embodiments, the assessment system may analyze and process the plurality of candidate geologic indicators through various analysis algorithms to determine the geologic indicators. For example, the plurality of candidate geologic indicators may be sorted (e.g., in a descending order) according to their corresponding weights for performing a screening process. The screening processing may be performed to select candidate geologic indicators with weights greater than a preset weight threshold (e.g., 0.5) as the geologic indicators; or select a preset count (e.g., 7, 10) of candidate geologic indicators with high rankings as the geologic indicators.

For example, the geologic indicators and their weights corresponding to the geologic body of the deep saline aquifer are shown in Table 1 below:

TABLE 1

| Geologic indicators and their weights corresponding to the geologic body of the deep saline aquifer | |
|---|---|
| Geologic Indicators | Weights |
| Reservoir Area | 0.332 |
| Reservoir Thickness | 0.191 |
| Porosity | 0.174 |
| Fracture Pressure Coefficient | 0.169 |
| Permeability | 0.103 |
| Formation Temperature Gradient | 0.022 |
| Formation Pressure | 0.009 |

For example, the geologic indicators and their weights corresponding to the geologic body of the depleted oil reservoir are shown in Table 2 below:

TABLE 2

| Geologic indicators and their weights corresponding to the geologic body of the depleted oil reservoir | |
|---|---|
| Geologic Indicators | Weights |
| Reservoir Area | 0.345 |
| Reservoir Thickness | 0.221 |
| Porosity | 0.172 |
| Formation Pressure | 0.129 |
| Fracture Pressure Coefficient | 0.086 |
| Permeability | 0.025 |
| Formation Temperature Gradient | 0.022 |

For example, the geologic indicators and their weights corresponding to the geologic body of the depleted gas reservoir are shown in Table 3 below:

TABLE 3

| Geologic indicators and their weights corresponding to the geologic body of the depleted gas reservoir | |
|---|---|
| Geologic Indicators | Weights |
| Reservoir Area | 0.318 |
| Reservoir Thickness | 0.262 |
| Porosity | 0.195 |
| Formation Pressure | 0.087 |
| Fracture Pressure Coefficient | 0.062 |
| Formation Temperature Gradient | 0.043 |
| Permeability | 0.033 |

In 320, the assessment result of the GCS capacity of the target region is determined based on the scores of the geologic indicators and the weights of the geologic indicators. In some embodiments, operation 320 may be performed by the assessment module 230.

The assessment result may be configured to reflect a magnitude of the GCS capacity of the target region, which may be expressed in a variety of forms. For example, the assessment result may be expressed as an assessment level A, an assessment level B, or an assessment level C. As another example, the assessment result may be expressed as a value, wherein a larger value indicates greater GCS capacity.

In some embodiments, the assessment system may determine the assessment result of the GCS capacity of the target region based on the scores of the geologic indicators and the weights of each of the geologic indicators through weighted summation or weighted averaging.

In some embodiments, the assessment system may determine the assessment result of the GCS capacity of the target region by solving a weighted decision matrix. More descriptions of determining the assessment result of the GCS capacity of the target region may be found in FIG. 5 and the relevant descriptions thereof.

In some embodiments of the present disclosure, by training a machine learning model and determining the geologic indicators and the weights of the geologic indicators based on the trained model, the accuracy of the geologic indicators and their weights can be improved, avoiding relying too much on personal experience and subjective judgment. In addition, an assessment accuracy of the GCS capacity may be improved by utilizing the geologic indicators and weights corresponding to the type of geologic body to which the target region belongs.

Meanwhile, storage capacity determination models corresponding to different types of geologic bodies (e.g., deep saline aquifer, depleted oil reservoir, depleted gas reservoir, etc.) are established based on the storage principle of different types of geologic bodies for GCS. Different storage capacity determination models are used to train different target models corresponding to different types of geologic bodies, thereby determining the geologic indicators and the weights corresponding to different types of geologic bodies, and a targeted analysis of different types of geologic bodies may be realized.

In some embodiments, in addition to assessing the GCS capacity of the target region, the target region may further be assessed from other aspects to more comprehensively determine whether the target region is suitable for GCS. For example, the target region may further be assessed from one or more aspects such as geologic safety, social environmental risk, economic feasibility, etc.

For example, the geologic safety may be assessed based on geologic safety indicators such as crustal stability (e.g., peak ground shaking acceleration, seismic safety of the target region), caprock closure (e.g., depth of the main caprock, continuity of the caprock distribution), a possible carbon dioxide leakage pathway (e.g., development of fractures and fissures), and hydrogeological conditions (e.g., hydrodynamic effect). The social environmental risk may be assessed based on social environment (e.g., population density, distance from residential area), geologic environment (e.g., susceptibility to geologic hazards), nature of the area in which it is located (e.g., whether it complies with a major plan for urban and regional development), relationship and distance with sources of drinking water (e.g., distance from surface drinking water sources, such as rivers). The economic feasibility may be assessed based on economic feasibility indicators such as size of the carbon source, distance to the carbon source, and mode of transportation.

FIG. 4 is a flowchart illustrating an exemplary process for determining scores of geologic indicators according to some embodiments of the present disclosure.

In some embodiments, process 400 may be performed by the assessment system. As shown in FIG. 4, the process 400 includes the following operations.

In 410, for each of the geologic indicators, a survey value of the geologic indicator of the target region is obtained.

The survey value refers to a measured value obtained after surveying the target region using a survey device (e.g., a geologic survey device). Different survey devices may be used to measure survey values of different types of geologic indicators. The survey value of a geologic indicator may be regarded as an indicator value of the geologic indicator. For example, the survey value of the storage thickness of the target region may be regarded as the indicator value of the indicator of the storage thickness (e.g., 100 m).

In some embodiments, various types of survey devices may be distributed and deployed based on geographic information of the target region. For example, the deployment location, the quantity, the model, the power, etc., of each type of survey device may be determined according to an actual situation (e.g., a geographic location, a geologic feature, an environmental feature, etc., in which the target region is located). The assessment system may control the various types of survey devices to survey and/or monitor the target region and obtain survey values of various geologic indicators. In some embodiments, each survey device may be connected to the processing device 110 through a network, and each survey device may transmit collected data to the processing device 110 through the network for further analysis. In some embodiments, a plurality of survey devices may form a distributed network.

For illustration purposes, exemplary processes for determining survey values are described below.

The assessment system may determine a storage area of the target region based on electromagnetic wave scanning data of the target region (such as the effective boundary range of detection, depth of detection, etc.) collected by a geologic radar. The assessment system may determine the permeability of the target region through Darcy's law based on the survey data (such as differential pressure and flow rate of nitrogen gas) collected by devices such as a core permeability measuring instrument. The assessment system may determine the formation pressure of the target region based on the survey data collected by devices such as manometers and static touch probes. The assessment system may determine the fracture pressure coefficient of the target region based on the fracture pressure and the formation pressure obtained by devices such as a Poisson's ratio measuring instrument, a densimeter, a manometer, and a stress gauge. The assessment system may determine the reservoir thickness based on the survey data collected by a resistivity/polarizability electrical instrument or other devices. The assessment system may determine the porosity based on the survey data collected by devices such as adsorption analyzers. The assessment system may determine the formation temperature gradient based on monitoring data collected by devices such as a well thermometer.

In some embodiments, the assessment system may determine a risk level of each geologic indicator and determine a collection frequency of a corresponding survey device based on the risk level.

The risk level of a geologic indicator may reflect the magnitude of risks brought by the geologic indicator to subsequent GCS operations. The GCS operations may involve underground activities such as well drilling, carbon dioxide injection into the geological body, etc. Fractures and cavities in the geological body may cause risks (e.g., a risk of leakage, a risk of collapse, etc.) to the GCS operation. For example, the survey values of geologic indicators such as the porosity and the fracture pressure coefficient need to be accurate because those geologic indicators have a greater impact on the subsequent carbon dioxide operation, therefore, the risk levels of those geologic indicators are higher.

The collection frequency of a survey device may reflect how frequent for the survey device to survey the target region, which indicates the amount of data that needs to be collected by the survey device. The collection frequency may be different for different geologic indicators. The survey device may have a higher collection frequency if its corresponding geologic indicator has a higher risk level, indicating that the survey device needs to collect a larger amount of survey data. For example, the survey data relating to the fracture pressure and the formation pressure of the target area is collected by survey devices such as Poisson's ratio measuring instrument. The assessment system may set more survey locations, a shorter collection interval, a longer collection period, etc., to collect more survey data relating to the fracture pressure and the formation pressure of the target area, thereby obtaining a more accurate fracture pressure coefficient of the target area.

In some embodiments, the assessment system may perform a de-noising process on an initial survey dataset corresponding to a geologic indicator to obtain target survey data corresponding to the geologic indicator, and further determine the survey value of the geologic indicator based on the target survey data.

The initial survey dataset is a collection of survey data collected by survey device(s) within a preset collection period (e.g., three days, one week, etc.). The initial survey dataset may include data sub-sets corresponding to the same geologic indicator collected by multiple survey devices at different areas in the target region. The de-noising process refers to a process of screening the initial survey dataset to remove anomalous survey data. For example, for each data sub-set collected by one survey device or multiple survey devices in one area, the assessment system may first determine a variance of the survey values in the data subset. If the variance is greater than a threshold, some survey values having a great deviation from the average survey value of the data sub-set may be removed.

In some embodiments of the present disclosure, anomalous survey data of the initial survey data set may be removed, which makes the target survey data more comply with an actual situation of the geological body, and improves the accuracy of the survey value corresponding to the geologic indicator.

In some embodiments, the assessment system may determine a confidence level of the target survey data based on a plurality of reference data sources. The reference data sources may include, for example, historical survey data, third-party survey data (e.g., publicly available survey data, etc.), etc., of the target region. It may be understood that the accuracy of the survey data may be affected by the accuracy of the survey devices and a variability of the environment (e.g., external temperature, humidity, weather, etc.) of the target region during different time periods. The assessment system may determine a similarity of the target survey data to survey data from the plurality of reference data sources to determine the confidence level of the target survey data. For example, when the difference between the statistical values (e.g., the maximum value, the minimum value, and the average value) of the target survey data and the statistical values of the reference data sources is less than a difference threshold, the target survey data may be deemed as having a relatively high confidence level. In some embodiments of the present disclosure, by assessing the confidence level of the target survey data based on the reference data sources, the survey values of the geologic indicators determined based on the target survey data are more accurate.

It should be noted that the assessment system may obtain on-site survey values of one or more of the survey devices from a storage device (e.g., a disk, a hard disk, etc.), or determine the survey values based on the data from a third-party authoritative organization. Alternatively, the survey value of a certain geologic indicator of the target region may be replaced by a simulated value obtained by data simulation or data prediction. For the conveniences of descriptions, the survey values are used in the present disclosure to represent the values of the geologic indicators determined in various manners (actual survey, data simulation, etc.).

In some embodiments, the survey value of a geologic indicator may be, for example, a maximum, minimum, or average value of the survey data of the target region. For example, the survey value corresponding to the formation pressure may be the average formation pressure of the target region. In some embodiments, the survey value of a geologic indicator may be expressed as a spatial function. More descriptions regarding a spatial function may be found in operation 420.

In 420, for each of the geologic indicators, the score of the geologic indicator is determined based on the survey value of the geologic indicator.

In some embodiments, for a geologic indicator, the assessment system may determine the score of the geologic indicator based on the survey value of the geologic indicator and the value range of the geologic indicator. Taking the permeability as an example, when the survey value of the permeability of the target region is within different value ranges, the permeability of the target region is assigned with different scores. For example, when the permeability is greater than 100 mD, the score is 9; when the permeability is within a range of 1 mD to 100 mD, the score is 5; and when the permeability is less than 1 mD, the score is 1.

In some embodiments, for at least one of the geologic indicators, the score is linearly correlated with its survey value within a target range. For example, the at least one geologic indicator may include the reservoir area, the reservoir thickness, the porosity, the fracture pressure coefficient, etc. The score being linearly correlated with the survey value within the target range may mean that the score of the geologic indicator and its corresponding survey value have a linear functional relationship. Taking the reservoir area as an example, with the survey value of the reservoir area as a variable, the score corresponding to the reservoir area may be determined through a preset linear function, at this time, the survey value of the reservoir area is linearly correlated with the score of the reservoir area.

In some embodiments, the assessment system may determine an indicator score corresponding to each of the geologic indicators based on a preset indicator scoring table. The indicator scoring table may record a relationship between scores of the geologic indicators and survey values of the geologic indicators. The indicator scoring table may be stored in a storage device, and the assessment system may search through the indicator scoring table based on the survey value of each of the geologic indicators to obtain the score corresponding to each geologic indicator.

For illustration purposes, an exemplary indicator scoring table is illustrated in Table 4 as shown below.

TABLE 4

Indicator Scoring Table

| Geologic indicators | | Survey values and scores | | | |
|---|---|---|---|---|---|
| Reservoir area/ km², A | Range Score | <50 1 | 50-1000 0.0084 × (A−50) + 1 | | >1000 9 |
| Permeability/ mD, K | Range Score | <1 1 | 1-100 5 | | >100 9 |
| Formation pressure/MPa, p | Range Score | <6 1 | 6-9 5 | >20 7 | 9-20 9 |
| Fracture pressure coefficient, ξ | Range Score | <1.2 1 | 1.2-2 10 × (ξ−1.2) + 1 | | >2 9 |
| Reservoir thickness/m, h | Range Score | <10 3 | 10-100 0.067 × (h−10) + 3 | | >100 9 |
| Porosity, φ | Range Score | <10% 1 | 10-25% 53 × (φ−10%) + 1 | | >25% 9 |
| Formation temperature gradient/ (° C. · km⁻¹), $k_T$ | Range Score | >50 1 | 30-50 3 | 20-30 5 | <20 >50 7 9 |

As shown in Table 4, the geologic indicators may include the reservoir area, the permeability, the formation pressure, the fracture pressure coefficient, the reservoir thickness, the porosity, and the formation temperature gradient. The value range of each geologic indicator is divided into several intervals, and different intervals correspond to different scores.

Four geologic indicators, the reservoir area, the fracture pressure coefficient, the reservoir thickness, and the porosity, have corresponding target ranges. Within these target ranges, the scores are linearly correlated with the survey values. Taking the reservoir area in Table 4 as an example, when the survey value is less than 50 km², the score is 1; when the survey value is greater than 1,000 km², the score is 9; and when the survey value is within the range of 50 km²-1,000 km², the score=0.0084×(A−50)+1, where A is an actual survey value. In other words, a range of 50 km²-1,000 km² is the target range corresponding to the reservoir area.

In some embodiments of the present disclosure, based on the survey value corresponding to each geologic indicator, the score of each geologic indicator may be quickly obtained by searching through the indicator scoring table as shown in Table 4. At the same time, a quantification degree of the scores of the geologic indicator is made more refined by setting the target range, thereby improving the accuracy of subsequent assessment of the storage capacity. A conventional indicator scoring table may assign the same score to a geologic indicator when it is within a specific interval. Compared with the conventional indicator scoring table, the indicator scoring table disclosed herein is more refined such that different indicator values of the geologic indicator within the target range can be differentiated.

In some embodiments, the geologic indicators of the target region include a target geologic indicator, wherein the survey value of the target geologic indicator is expressed as a spatial function.

The target geologic indicator may include one or more geologic indicators whose survey values are expressed as spatial functions. A spatial function may be used to express the relationship between the survey value and the spatial location. Since the area of the GCS site is usually great (e.g., on an order of cubic kilometers), the values of a certain geologic indicator may change with a change of the spatial location and it is difficult to accurately express the geologic indicator of an entire GCS site with a fixed value (e.g., a maximum and an average), resulting in that the subsequent assessment of storage capacity is relatively less accurate. In order to avoid the influence of such changes on the assessment result, some specific geologic indicators may be expressed in the form of spatial functions (i.e., some specific geologic indicators may be regarded as target geologic indicators), and the GCS capacity may be assessed based on the spatial functions.

In some embodiments, the assessment system may divide the target region into a plurality of classes of sub-regions based on the survey value of the target geologic indicator; and determine a score of the target geologic indicator for each class of sub-regions; and determine a score of the target geologic indicator of the target region based on the score of the target geologic indicator of each class of sub-regions and a second weight of each class of sub-regions. The second weight of a class of sub-regions relates to a ratio of the size of the class of sub-regions to the size of the target region. In the present disclosure, the size of the target region may be measured by the occupied area or the occupied volume of the target region.

The sub-regions are determined by dividing the target region. For example, the assessment system may divide the target region into a preset count of sub-regions (e.g., 10, 20) based on the size of the target region. The class of each sub-region may be determined based on the survey value of the target geologic indicator of the sub-region. It may be understood that, for the target region with a relatively large area or volume, the survey values of the target geologic indicator of different sub-regions are similar or different to some extent due to different locations of the sub-regions in the target region. If the survey values of the target geologic indicator of two or more sub-regions are relatively similar (e.g., the difference is less than a threshold value), the assessment system may class the two or more sub-regions as sub-regions of the same class.

In some embodiments, the assessment system may first divide the target region into a preset count of initial sub-regions (which are also referred to as region units). For example, the target region is a three-dimensional spatial region, which may be divided into a plurality of three-dimensional initial sub-regions of equal volume, and the shape of these initial sub-regions may be the cube, the rectangle, etc. Further, the assessment system may cluster the plurality of initial sub-regions based on the survey value of the target geologic indicator of each initial sub-region to obtain a plurality of classes of the initial sub-regions. The assessment system may then determine the plurality of classes of sub-regions based on the classes of the initial sub-regions. Specifically, if a plurality of adjacent initial sub-regions belongs to the same class, the plurality of adjacent initial sub-regions may be combined into a single sub-region. If an initial sub-region and all of its adjacent initial sub-regions belong to different classes, the initial sub-region may be treated as a single sub-region. It should be understood that, since the survey value of the target geologic indicator is a spatial function, the survey value of the target geologic indicator of each sub-region or each initial sub-region may be determined based on the spatial location.

When the target region has been divided into the plurality of classes of sub-regions, the assessment system may determine the scores of the target geologic indicator of each class of sub-regions based on an indicator scoring table (e.g., Table 4).

The assessment system may further determine the second weight of each class of sub-regions. The second weight may be determined based on a ratio of the size of each class of sub-regions to the size of the target region. A greater ratio indicates a greater size of the class of sub-regions, and the second weight corresponding to the class of sub-regions may be greater.

In some embodiments, the assessment system may determine a score of the target geologic indicator for the entire target region by determining a weighted average based on the scores of the target geologic indicator of the classes of sub-regions and the second weights. For example, for the reservoir thickness, the assessment system may determine a weighted average of the scores of the reservoir thickness of the classes of sub-regions based on the second weight of each class of sub-regions, and designate the weighted average as the score of the reservoir thickness of the entire target region.

In some embodiments of the present disclosure, by classifying the sub-regions, the spatial distribution and different characteristics of different sub-regions are considered, the score of each target geologic indicator of the target region is more refined and more conform to the actual situation of the target region, and the accuracy of the score is improved.

In some embodiments, after determining the score of each geologic indicator, the assessment system may determine the assessment result of the GCS capacity of the target region based on the scores of the geologic indicators and the weights of the geologic indicators. For each class of sub-regions, the assessment result of the GCS capacity of the class of sub-regions may be determined based on the scores of the geologic indicators of the class of sub-regions and the weights of the geologic indicators; the assessment result of the target region may be determined based on the assessment result of each class of sub-regions. More descriptions of determining the assessment result of the GCS capacity may be found in FIG. 5 and the related description thereof.

Figure 5:
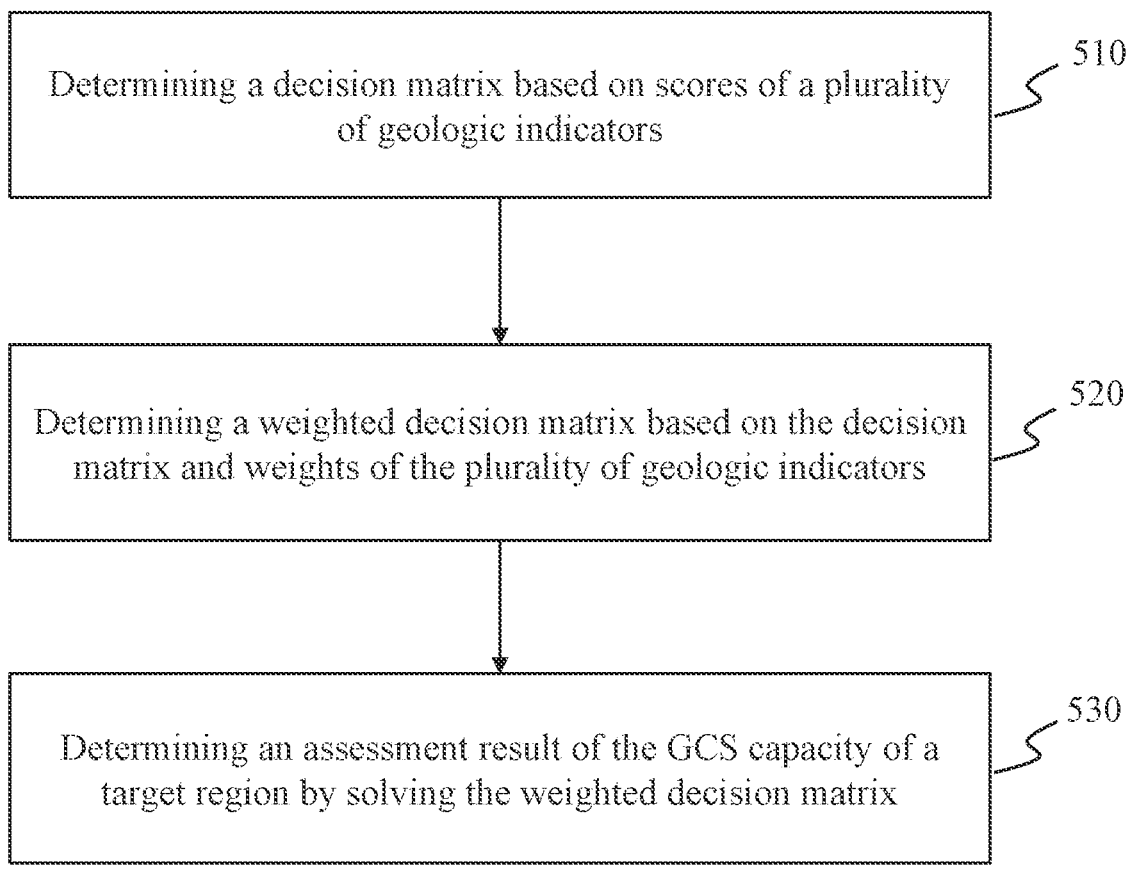
FIG. 5 is a flowchart illustrating an exemplary process for determining an assessment result of the GCS capacity of a target region according to some embodiments of the present disclosure.

FIG. 5 is a flowchart illustrating an exemplary process for determining an assessment result of the GCS capacity of a target region according to some embodiments of the present disclosure.

In some embodiments, process 500 may be performed by the assessment system. In some embodiments, the process 500 may be performed to achieve operation 320. As shown in FIG. 5, the process 500 includes the following operations.

In 510, a decision matrix is determined based on scores of a plurality of geologic indicators.

The decision matrix may express a correlation relationship between the GCS site selection plan and the geologic indicators. A GCS site selection plan may also be referred to as a candidate region for GCS and may include the target region and one or more other candidate regions. The decision matrix may be used to select an optimal storage site from the target region and the one or more other candidate regions.

The decision matrix may be in the form of a decision table or a scoring table with a plurality of rows and columns, which may include the candidate regions for the GCS (e.g., as row data), and the geologic indicators of each candidate region and their scores (e.g., as column data). In some embodiments, the assessment system may construct the decision matrix based on the candidate regions, the geologic indicators, and the scores of each candidate region. The candidate regions may include the target region and one or more other candidate regions. The scores of a candidate region are determined in a manner similar to how the scores of the target region are determined.

In some embodiments, the assessment system may normalize the decision matrix to generate a normalized decision matrix. For example, a normalization of the decision matrix may be performed based on Equation (5a) as shown below:

$$r_{ij} = \frac{f_{ij}}{\sqrt{\sum_{k=1}^{n} f_{kj}^2}} \quad j=1,\ldots,m; i=1,\ldots,n \quad \text{Equation (5a)}$$

where, in Equation (5a), j denotes the $j^{th}$ geologic indicator; m denotes the number (e.g., 7) of the geologic indicators (e.g., the reservoir area, the permeability, etc.); i denotes the $i^{th}$ candidate region; n is the number of the candidate regions; $f_{ij}$ denotes the value of the element with a coordinate (i, j) in the decision matrix, which is equal to the score of the $j^{th}$ geologic indicator of the $i^{th}$ candidate region; $r_{ij}$ denotes the value of the element with a coordinate (i, j) in the normalized decision matrix, which is equal to a normalized score of the $j^{th}$ geologic indicator of the $i^{th}$ candidate region. The decision matrix described in the following descriptions may refer to the normalized decision matrix.

In 520, a weighted decision matrix is determined based on the decision matrix and weights of the geologic indicators.

The weighted decision matrix is a decision matrix that has been weighted. For example, the assessment system may determine a weighted decision matrix based on Equation (5b) as shown below:

$$v_{ij} = w_j r_{ij}, \quad \text{Equation (5b)}$$

where, in Equation (5b), $v_{ij}$ denotes the value of the element with a coordinate (i, j) in the weighted decision matrix, which is equal to a weighted score of the $j^{th}$ geologic indicator of the $i^{th}$ candidate region; $w_j$ denotes the weight corresponding to the $j^{th}$ geologic indicator.

In 530, the assessment result of the GCS capacity of the target region is determined by solving the weighted decision matrix.

In some embodiments, the assessment system may determine a composite index of the target region by solving the weighted decision matrix as the assessment result of the GCS capacity. The composite index may indicate the magnitude of the GCS capacity, and the greater the composite index, the greater the GCS capacity.

In some embodiments, the assessment system may determine a positive ideal solution $A^+$ and a negative ideal solution $A^-$ based on an optimal value and a worst value of each geologic indicator in the weighted decision matrix of all the candidate regions. The positive ideal solution $A^+$ may maximize the value of the positive indicator and minimize the value of the negative indicator, and the negative ideal solution $A^-$ may minimize the value of the positive indicator and maximize the value of the negative indicator. A positive indicator refers to a geologic indicator whose value is positively correlated with the GCS capacity, while a negative indicator refers to a geologic indicator whose value is negatively correlated with the GCS capacity. The values of a positive indicator and a negative indicator are the scores corresponding to the positive indicator and the negative indicator, respectively. It may be understood that the positive ideal solution $A^+$ is a combination of the optimal values of the geologic indicators (e.g., 7 geologic indicators) selected from the weighted decision matrix of the candidate regions; and the negative ideal solution $A^-$ is a combination of the worst values of the geologic indicators selected from the weighted decision matrix of the candidate regions.

In some embodiments, the positive ideal solution $A^+$ and the negative ideal solution $A^-$ may be respectively determined based on Equation (5c) and Equation (5d) shown below:

$$A^+ = v_1^+, \ldots, v_m^+ = \{(\max v_{ij}|j \in I'), (\min v_{ij}|j \in I'')\}, \quad \text{Equation (5c)}$$

$$A^- = v_1^-, \ldots, v_m^- = \{(\min v_{ij}|j \in I'), (\max v_{ij}|j \in I'')\}, \quad \text{Equation (5d)}$$

where $I'$ in Equation (5c) and Equation (5d) is a set of positive indicators; $I''$ is a set of negative indicators; $v_j^+$ denotes the optimal value of the $j^{th}$ geologic indicator in the weighted decision matrix of the candidate regions; $v_j^-$ denotes the worst value of the $j^{th}$ geologic indicator in the weighted decision matrix of the candidate regions.

For the $i^{th}$ candidate region, the assessment system may further determine a Euclidean distance $d_i^+$ and $d_i^-$ between the $i^{th}$ candidate region and the positive ideal solution and the negative ideal solution by using Equation (5e) and Equation (5f) as shown below, to determine difference information between the $i^{th}$ candidate region and the positive ideal solution and the negative ideal solution, and determine the composite index $c_i$ of the candidate region based on the Equation (5g) shown below:

$$d_i^+ = \sqrt{\sum_{j=1}^{m}(v_{ij} - v_j^+)^2}, \quad \text{Equation (5e)}$$

$$d_i^- = \sqrt{\sum_{j=1}^{m}(v_{ij} - v_j^-)^2}, \quad \text{Equation (5f)}$$

$$c_i = \frac{d_i^-}{d_i^+ + d_i^-}. \quad \text{Equation (5g)}$$

A greater value of the composite index $c_i$ in the Equation (5g) may indicate that the $i^{th}$ candidate region is more suitable for GCS. It may be understood that when a candidate region has a smaller Euclidean distance from the positive ideal solution or a greater Euclidean distance from the negative ideal solution, the candidate region is more suitable for GCS.

An exemplary process for determining the optimal storage site is described below, and four candidate regions of deep saline aquifer are taken as examples. Table 5 illustrates the survey values of the geologic indicators of these four candidate regions A1-A4.

TABLE 5

Survey Values of Geologic Indicators of Candidate Regions

| Candidate region | Reservoir area/km² | Permeability/ mD | Formation pressure/ MPa | Fracture pressure coefficient | Reservoir thickness/ m | Porosity/ % | Formation temperature gradient/ (° C. · km⁻¹) |
|---|---|---|---|---|---|---|---|
| A1 | 128 | 249 | 20 | 1.52 | 337 | 15.5 | 2.8 |
| A2 | 72 | 150 | 28 | 1.49 | 730 | 15.2 | 2.6 |
| A3 | 72 | 50 | 32 | 1.83 | 255 | 22.4 | 3.2 |
| A4 | 403 | 130 | 15 | 1.38 | 75 | 19 | 3.3 |

The assessment system may score each of the seven geologic indicators of the four candidate regions according to the indicator scoring table, thereby forming the decision matrix. Further, the decision matrix may be normalized according to the Equation (5a) to generate the normalized decision matrix as shown in Table 6 below.

TABLE 6

Normalized Decision Matrix

| Candidate region | Reservoir area/km² | Permeability/ mD | Formation pressure/ MPa | Fracture pressure coefficient | Reservoir thickness/ m | Porosity/ % | Formation temperature gradient/ (° C. · km⁻¹) |
|---|---|---|---|---|---|---|---|
| A1 | 0.359 | 0.550 | 0.558 | 0.433 | 0.522 | 0.357 | 0.606 |
| A2 | 0.257 | 0.550 | 0.434 | 0.402 | 0.522 | 0.343 | 0.606 |
| A3 | 0.257 | 0.305 | 0.434 | 0.753 | 0.522 | 0.691 | 0.364 |
| A4 | 0.860 | 0.550 | 0.558 | 0.289 | 0.427 | 0.527 | 0.364 |

Figure 6:
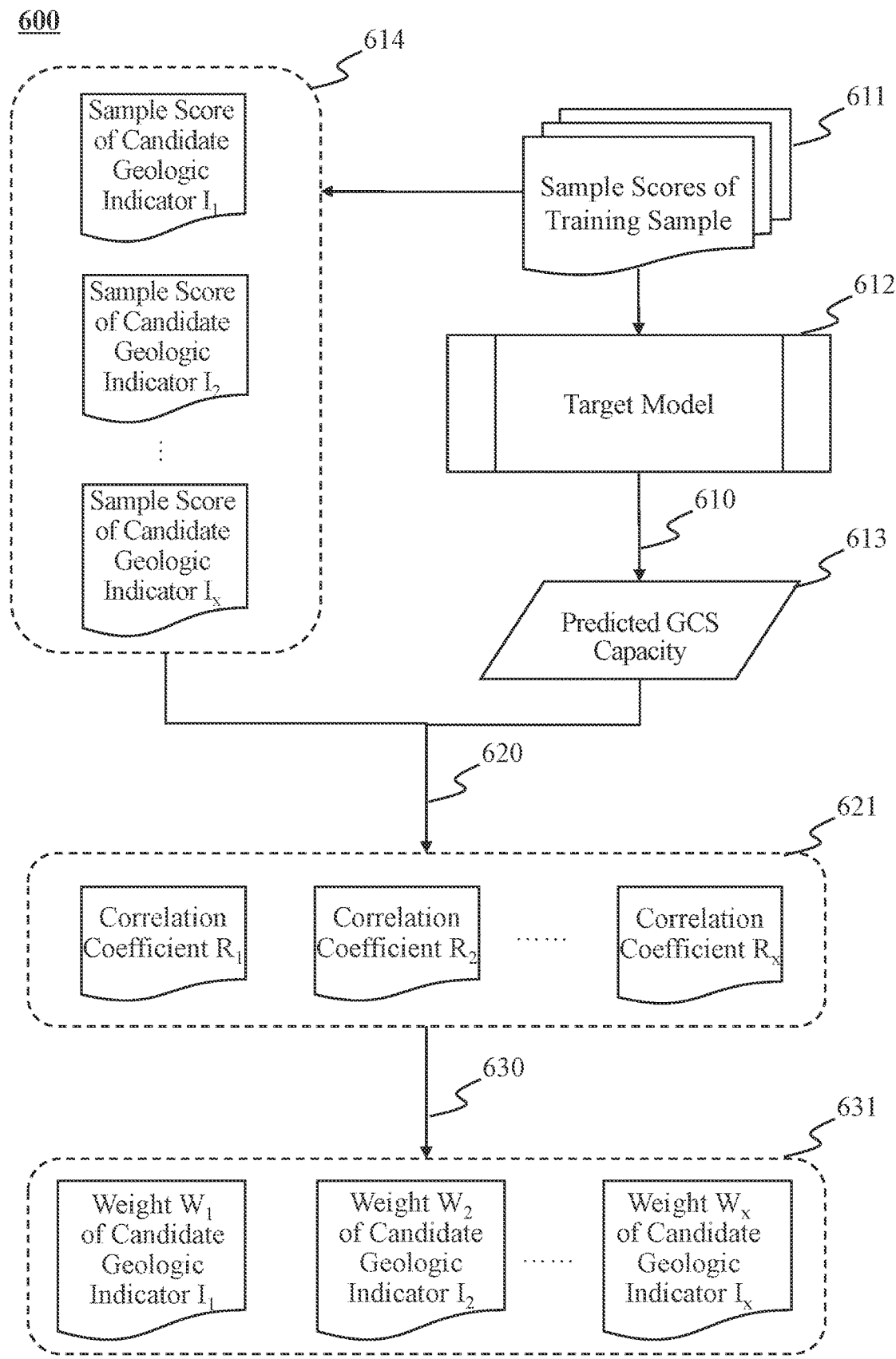
FIG. 6 is a flowchart illustrating an exemplary process for determining weights of candidate geologic indicators according to some embodiments of the present disclosure.

The assessment system may further weight the normalized decision matrix according to the weight of each geologic indicator through Equation (5b) to generate the weighted decision matrix shown in Table 7 below. The weight of each geologic indicator may be determined according to Table 1 or according to the process as shown in FIG. 6.

TABLE 7

Weighted Decision Matrix

| Candidate region | Reservoir area/km$^2$ | Permeability/ mD | Formation pressure/ MPa | Fracture pressure coefficient | Reservoir thickness/ m | Porosity/ % | Formation temperature gradient/ (° C. · km$^{-1}$) |
|---|---|---|---|---|---|---|---|
| A1 | 0.119 | 0.057 | 0.005 | 0.073 | 0.100 | 0.062 | 0.013 |
| A2 | 0.085 | 0.057 | 0.004 | 0.068 | 0.100 | 0.060 | 0.013 |
| A3 | 0.085 | 0.031 | 0.004 | 0.127 | 0.100 | 0.120 | 0.008 |
| A4 | 0.285 | 0.057 | 0.005 | 0.049 | 0.082 | 0.092 | 0.008 |

The assessment system may further determine the positive ideal solution and the negative ideal solution according to Equation (5c) and Equation (5d) and determine the difference between each candidate region, the positive ideal solution, and the negative ideal solution according to Equation (5e) and Equation (5f). The assessment system may determine the composite index of each candidate region according to Equation (5g) and sort the candidate regions according to their composite indexes (e.g., in descending order). The sorting result of the candidate regions is shown in Table 8 below.

TABLE 8

Ranking results of candidate regions

| Ranking | Candidate regions | d$^+$ | d$^-$ | c$_i$ |
|---|---|---|---|---|
| 1 | A4 | 0.086 | 0.204 | 0.705 |
| 2 | A3 | 0.202 | 0.101 | 0.333 |
| 3 | A1 | 0.184 | 0.052 | 0.221 |
| 4 | A2 | 0.217 | 0.037 | 0.145 |

As shown in Table 8, candidate region A4 has the greatest composite index (0.705). Therefore, the candidate region A4 is an optimal storage site.

In some embodiments of the present disclosure, the assessment result of the GCS capacity of the target region is determined by solving the weighted decision matrix, which greatly enhances the quantification degree and the accuracy of the process of determining the assessment result. At the same time, based on the quantitative assessment system proposed in the present disclosure, an optimal GCS site may be automatically determined based on actual survey values of a plurality of candidate regions.

In some embodiments, the assessment system may divide the target region into a plurality of classes of sub-regions based on the survey value of a target geologic indicator, and the scores of the geologic indicators of the target region include the scores of the geologic indicators of each class of sub-regions. For each class of sub-regions, the assessment system may determine the assessment result of the GCS capacity of the class of sub-regions based on the scores of the geologic indicators of the class of sub-regions and the weights of the geologic indicators, and determine the assessment result of the target region based on the assessment result of each class of sub-regions.

Descriptions of the sub-regions and the division of the target region into the plurality of classes of sub-regions may be found in FIG. 4 and the related descriptions.

In some embodiments, for each geologic indicator of each class of sub-regions, the assessment system may determine a score of the geologic indicator based on the survey value of the geologic indicator of the class of sub-regions. That is, the assessment system may separately perform the process 400 for each class of sub-regions to determine the scores of the geologic indicators of the class of sub-regions.

Further, the assessment system may perform the process 500 for each class of sub-regions to determine an assessment result of the class of sub-regions. Specifically, a composite index for each class of sub-regions may be determined based on the scores of the geologic indicators and the weights of the geologic indicators of the class of sub-regions. Accordingly, a composite index of the target region may be obtained based on the average of the composite index of each class of sub-regions.

In some embodiments of the present disclosure, the target region may be divided into multiple classes of sub-regions, and the composite index of the target region may be determined based on the composite indexes of the plurality of classes of sub-regions. An effect of an uneven distribution of a target geologic indicator when the target region is relatively great on the assessment result of the target region may thus be reduced or eliminated, thereby obtaining a more accurate assessment result of the GCS capacity of the target region.

FIG. 6 is a flowchart illustrating an exemplary process for determining weights of candidate geologic indicators according to some embodiments of the present disclosure.

In some embodiments, process 600 may be performed by an assessment system. In some embodiments, the process 600 may be performed to achieve operation 310. As shown in FIG. 6, the process 600 includes the following operations.

In 610, for each of the plurality of training samples, a predicted GCS capacity is determined for the training sample based on the sample scores of the training sample and the target model.

In some embodiments, as shown in FIG. 6, the assessment system may input sample scores 611 of each training sample into a target model 612. For each training sample, a predicted GCS capacity 613 corresponding to the training sample is obtained after the target model 612 processes the sample scores 611 of the training sample.

The sample scores 611 of a training sample may include sample scores of a plurality of candidate geologic indicators, where the plurality of candidate geologic indicators may include a candidate geologic indicator $I_1$, a candidate geologic indicator $I_2$, . . . , a candidate geologic indicator $I_x$, wherein x denotes the number of the candidate geologic indicators. For example, the candidate geologic indicator $I_1$ may be the reservoir area, the candidate geologic indicator $I_2$ may be the permeability, . . . , and the candidate geologic indicator $I_x$ may be the porosity. More descriptions regarding the candidate geologic indicators and the target model may be found in FIG. 3 and the related descriptions thereof.

In 620, the correlation coefficient between each candidate geologic indicator and the GCS capacity is determined based on the sample scores of the plurality of candidate geologic indicators and the predicted GCS capacity of each training sample.

A correlation coefficient of a candidate geologic indicator may characterize a correlation degree between the candidate geologic indicator and the GCS capacity. For example, the correlation coefficient may be in the form of a numerical value, wherein the greater the value, the higher the correlation degree between the candidate geologic indicator and the GCS capacity.

The assessment system may determine the correlation coefficient of a candidate geologic indicator through various types of correlation analysis algorithms. In some embodiments, the correlation analysis algorithms may include Pearson correlation analysis, and the correlation coefficient may be a Pearson correlation coefficient (PCC). A Pearson correlation coefficient is a real number between −1 and 1. The closer the absolute value of the Pearson correlation coefficient is to 1, the stronger the correlation between the candidate geologic indicator and the GCS capacity; and the closer the absolute value of the Pearson correlation coefficient is to 0, the weaker the correlation.

In some embodiments, for each candidate geologic indicator, the assessment system may determine a quotient of the covariance between the candidate geologic indicator and the GCS capacity to the standard deviation of the candidate geologic indicator and the standard deviation of the GCS capacity, to determine the correlation coefficient of the candidate geologic indicator. As shown in FIG. 6, the correlation coefficients 621 include a correlation coefficient $R_1$, a correlation coefficient $R_2$, . . . , and a correlation coefficient $R_x$, which respectively indicates the correlation between one candidate geologic indicator and the GCS capacity.

In 630, the weight of each candidate geologic indicator is determined based on the correlation coefficient between each candidate geologic indicator and the GCS capacity.

In some embodiments, a greater weight may be assigned to a geologic indicator if the value (absolute value) of the correlation coefficient of the geologic indicator is greater.

In some embodiments, as shown in FIG. 6, the assessment system may determine weights 631 of the candidate geologic indicators based on the correlation coefficients 621, which include a weight $W_1$ of the candidate geologic indicator $I_1$, a weight $W_2$ of the candidate geologic indicator $I_2$, . . . , a weight $W_x$ of the candidate geologic indicator $I_x$. The weight of each of the candidate geologic indicators may be determined based on Equation (6a) shown below:

$$w_i = \frac{|R_i|}{\sum_{k=1}^{x} |R_k|}, \quad \text{Equation (6a)}$$

where $W_i$ in Equation (6a) is the weight of the candidate geologic indicator $I_i$, $R_i$ is the correlation coefficient between the candidate geologic indicator $I_i$ and the GCS capacity, $$\sum_{k=1}^{x} R_k$$

is the sum of the correlation coefficients of all candidate geologic indicators.

In some embodiments of the present disclosure, based on the target model and the Pearson correlation analysis, the weights of the candidate geologic indicators may be determined automatically and accurately, thereby selecting the geologic indicators more accurately.

It should be noted that the above description of the processes is merely provided for the purpose of example and illustration only and not intended to limit the scope of the present disclosure. For those skilled in the art, various amendments and variations may be made to the process under the teaching of the present disclosure. However, these amendments and variations remain within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Therefore, by way of example, but not of limitation, alternative configurations of the embodiments of the application may be utilized in accordance with the teachings herein. Accordingly, embodiments of the present application are not limited to that precisely as shown and described.

What is claimed is:

1. A method for assessing geological carbon dioxide storage (GCS) capacity, comprising:
   for each of a plurality of geologic indicators of a target region, obtaining a survey value of the geologic indicator of the target region;
   for each of the plurality of geologic indicators, determining a score of the geologic indicator based on the survey value of the geologic indicator, wherein the target region belongs to a target type of geologic body for GCS, and the target type includes one of a deep saline aquifer, a depleted oil reservoir, and a depleted gas reservoir; and
   determining an assessment result of the GCS capacity of the target region based on the scores of the plurality of geologic indicators and weights of the plurality of geologic indicators, wherein the plurality of geologic indicators and the weights of the plurality of geologic indicators are determined by:
      determining value ranges of a plurality of candidate geologic indicators of the target type of the geologic body;
      determining a plurality of training samples corresponding to the target type of the geologic body based on the value ranges of the plurality of candidate geologic indicators, each training sample including a sample value and a sample score of each candidate geologic indicator, and the sample value of each candidate geologic indicator being within its corresponding value range;
      for each of the plurality of training samples, determining the GCS capacity corresponding to the training sample based on a storage capacity determination model corresponding to the target type of the geologic body, the storage capacity determination model being a numerical model that includes a flow term, a diffusion term, a source-sink term, and a cumulative term, the flow term relating to a gas phase, a water phase and an oil phase flowing in the geologic body; the diffusion term relating to diffusion of components within and between a gas phase, a water phase and an oil phase; the source-sink term relating to the injection of carbon dioxide; and the cumulative term relating to the GCS capacity; and the cumulative term being equal to the sum of the flow term, the diffusion term, and the source-sink term;
      generating a target model for GCS capacity prediction based on each of the plurality of training samples and the GCS capacity corresponding to each of the plurality of training samples using a machine learning algorithm, the target model being a trained machine learning model;
      for each of the plurality of training samples, determining a predicted GCS capacity for the training sample based on the sample scores of the training sample and the target model;
      determining a correlation coefficient between each candidate geologic indicator and the GCS capacity based on the sample scores of the plurality of candidate geologic indicators and the predicted GCS capacity of each training sample;
      determining a weight of each candidate geologic indicator based on the correlation coefficient between each candidate geologic indicator and the GCS capacity; and
      determining the plurality of geologic indicators from the plurality of candidate geologic indicators based on the weight of each candidate geologic indicator,
   wherein the storage capacity determination model includes one of a storage capacity determination model corresponding to the deep saline aquifer, a storage capacity determination model corresponding to the depleted oil reservoir, and a storage capacity determination model corresponding to the depleted gas reservoir,
   the storage capacity determination model corresponding to the deep saline aquifer is determined based on Equations (1a)-(1f) below:

$$\frac{\partial}{\partial t}[\varphi(C_{i,g}\rho_g S_g + C_{i,w}\rho_w S_w)] = -\nabla[(C_{i,g}\rho_g v_g + C_{i,w}\rho_w v_w)] + \nabla(D_{i,g}\rho_g \nabla C_{i,g} + D_{i,w}\rho_w \nabla C_{i,w}) + q_i, \quad \text{Equation (1a)}$$

$$v_g = -\frac{KK_{rg}}{\mu_g}\nabla(p_g - \rho_g g D_Z), \quad \text{Equation (1b)}$$

$$v_w = -\frac{KK_{rw}}{\mu_w}\nabla(p_w - \rho_w g D_Z), \quad \text{Equation (1c)}$$

$$S_g + S_W = 1, \quad \text{Equation (1d)}$$

-continued $$\sum C_{i,g} = 1, \quad \text{Equation (1e)}$$

$$\sum C_{i,w} = 1, \quad \text{Equation (1f)}$$

where in Equation (1a), $-\nabla[(C_{i,g}\rho_g v_g + C_{i,w}\rho_w v_w)]$ is the flow term, $\nabla(D_{i,g}\rho_g \nabla C_{i,g} + D_{i,w}\rho_w \nabla C_{i,w})$ is the diffusion term, and $$\frac{\partial}{\partial t}[\varphi(C_{i,g}\rho_g S_g + C_{i,w}\rho_w S_w)]$$

is the cumulative term, the subscript i denotes carbon dioxide, water, or salt; the subscripts g and w denote the gas phase and the water phase, respectively; t denotes the time; φ denotes the porosity, and C denotes a mass fraction, $C_{i,g}$ and $C_{i,w}$ denote the mass fraction of the component i in the gas phase and the water phase, respectively; ρ denotes density; S denotes saturation, $S_g$ denotes saturation of the gas phase, and $S_w$ denotes saturation of the water phase; D denotes a diffusion coefficient, $D_{i,g}$ and $D_{i,w}$ denote the diffusion coefficient of component i in the gas phase and the water phase, respectively; $q_i$ refers to the source-sink term, which denotes an amount of carbon dioxide injected into the target region; v denotes a flow rate, and $v_g$ denotes the flow rate of the gas phase, and $v_w$ denotes the flow rate of the water phase;

in Equation (1b) and (1c), K denotes an absolute permeability of the formation; $K_{rg}$ and $K_{rw}$ are relative permeabilities of the gas phase and the water phase, respectively; μ is a fluid viscosity; $p_g$ and $p_w$ are the pressures of the gas phase and the water phase, respectively; g is a gravitational acceleration; $D_Z$ is a longitudinal depth;

the storage capacity determination model corresponding to the depleted oil reservoir is determined based on Equations (2a)-(2h) below:

$$\frac{\partial}{\partial t}[\varphi(C_{i,g}\rho_g S_g + C_{i,w}\rho_w S_w + C_{i,o}\rho_o S_o)] = \quad \text{Equation (2a)}$$

$$-\nabla[(C_{i,g}\rho_g v_g + C_{i,w}\rho_w v_w + C_{i,o}\rho_o v_o)] +$$

$$\nabla(D_{i,g}\rho_g \nabla C_{i,g} + D_{i,w}\rho_w \nabla C_{i,w} + D_{i,o}\rho_o \nabla C_{i,o}) + q_i,$$

$$v_g = -\frac{KK_{rg}}{\mu_g}\nabla(p_g - \rho_g g D_Z), \quad \text{Equation (2b)}$$

$$v_w = -\frac{KK_{rw}}{\mu_w}\nabla(p_w - \rho_w g D_Z), \quad \text{Equation (2c)}$$

$$v_o = -\frac{KK_{ro}}{\mu_o}\nabla(p_o - \rho_o g D_Z), \quad \text{Equation (2d)}$$

$$S_g + S_W + S_o = 1, \quad \text{Equation (2e)}$$

$$\sum C_{i,g} = 1, \quad \text{Equation (2f)}$$

$$\sum C_{i,w} = 1, \quad \text{Equation (2g)}$$

$$\sum C_{i,o} = 1, \quad \text{Equation (2h)}$$

where in Equations (2a)-(2h), the subscript i denotes carbon dioxide, water, or oil; the subscript o denotes the oil phase; the rest of the physical quantities are consistent with those in the storage capacity determination model corresponding to the deep saline aquifer;

the storage capacity determination model corresponding to the depleted gas reservoir is determined based on Equations (3a)-(3f) below:

$$\frac{\partial}{\partial t}[\varphi(C_{i,g}\rho_g S_g + C_{i,w}\rho_w S_w)] = -\nabla[(C_{i,g}\rho_g v_g + C_{i,w}\rho_w v_w)] + \quad \text{Equation (3a)}$$

$$\nabla(D_{i,g}\rho_g \nabla C_{i,g} + D_{i,w}\rho_w \nabla C_{i,w}) + q_i,$$

$$v_g = -\frac{KK_{rg}}{\mu_g}\nabla(p_g - \rho_g g D_Z), \quad \text{Equation (3b)}$$

$$v_w = -\frac{KK_{rw}}{\mu_w}\nabla(p_w - \rho_w g D_Z), \quad \text{Equation (3c)}$$

$$S_g + S_W = 1, \quad \text{Equation (3d)}$$

$$\sum C_{i,g} = 1, \quad \text{Equation (3e)}$$

$$\sum C_{i,w} = 1, \quad \text{Equation (3f)}$$

where in Equations (3a)-(3f), the subscript i denotes carbon dioxide, water, or natural gas; the rest of the physical quantities are consistent with those in the storage capacity determination model corresponding to the deep saline aquifer.

2. The method of claim 1, wherein for each of at least one of the plurality of geologic indicators, the score of the geologic indicator is linearly correlated with its survey value within a target range.

3. The method of claim 1, wherein the determining an assessment result of the GCS capacity of the target region based on the scores of the plurality of geologic indicators and weights of the plurality of geologic indicators includes:
   determining a decision matrix based on the scores of the plurality of geologic indicators;
   determining a weighted decision matrix based on the decision matrix and the weights of the plurality of geologic indicators; and
   determining the assessment result of the GCS capacity of the target region by solving the weighted decision matrix.

4. A device for assessing geological carbon dioxide storage (GCS) capacity, wherein the device comprises a processor configured to perform the method for assessing GCS capacity of claim 1.

5. A geological carbon dioxide storage (GCS) capacity assessing system, comprising:
   a score determination module configured for:
      for each of a plurality of geologic indicators of a target region, obtaining a survey value of the geologic indicator of the target region;
      for each of the plurality of geologic indicators, determining a score of the geologic indicator based on the survey value of the geologic indicator, wherein the target region belongs to a target type of geologic body for GCS, and the target type includes one of a deep saline aquifer, a depleted oil reservoir, and a depleted gas reservoir; and
   an assessment module configured for:
      determining an assessment result of the GCS capacity of the target region based on the scores of the plurality of geologic indicators and weights of the plurality of geologic indicators;
   an indicator and weight determination module configured for determining the plurality of geologic indicators and the weights of the plurality of geologic indicators by:

determining value ranges of a plurality of candidate geologic indicators of the target type of the geologic body;

determining a plurality of training samples corresponding to the target type of the geologic body based on the value ranges of the plurality of candidate geologic indicators, each training sample including a sample value and a sample score of each candidate geologic indicator, and the sample value of each candidate geologic indicator being within its corresponding value range;

for each of the plurality of training samples, determining the GCS capacity corresponding to the training sample based on a storage capacity determination model corresponding to the target type of the geologic body, the storage capacity determination model being a numerical model that includes a flow term, a diffusion term, a source-sink term, and a cumulative term, the flow term relating to a gas phase, a water phase and an oil phase flowing in the geologic body; the diffusion term relating to diffusion of components within and between a gas phase, a water phase and an oil phase; the source-sink term relating to the injection of carbon dioxide; and the cumulative term relating to the GCS capacity; and the cumulative term being equal to the sum of the flow term, the diffusion term, and the source-sink term;

generating a target model for GCS capacity prediction based on each of the plurality of training samples and the GCS capacity corresponding to each of the plurality of training samples using a machine learning algorithm, the target model being a trained machine learning model;

for each of the plurality of training samples, determining a predicted GCS capacity for the training sample based on the sample scores of the training sample and the target model;

determining a correlation coefficient between each candidate geologic indicator and the GCS capacity based on the sample scores of the plurality of candidate geologic indicators and the predicted GCS capacity of each training sample; and determining a weight of each candidate geologic indicator based on the correlation coefficient between each candidate geologic indicator and the GCS capacity; and determining the plurality of geologic indicators from the plurality of candidate geologic indicators based on the weight of each candidate geologic indicator, wherein the storage capacity determination model includes one of a storage capacity determination model corresponding to the deep saline aquifer, a storage capacity determination model corresponding to the depleted oil reservoir, and a storage capacity determination model corresponding to the depleted gas reservoir, the storage capacity determination model corresponding to the deep saline aquifer is determined based on Equations (1a)-(1f) below:

$$\frac{\partial}{\partial t}[\varphi(C_{i,g}\rho_g S_g + C_{i,w}\rho_w S_w)] = -\nabla[(C_{i,g}\rho_g v_g + C_{i,w}\rho_w v_w)] + \nabla(D_{i,g}\rho_g \nabla C_{i,g} + D_{i,w}\rho_w \nabla C_{i,w}) + q_i,$$

Equation (1a)

-continued $$v_g = -\frac{KK_{rg}}{\mu_g}\nabla(p_g - \rho_g g D_Z),$$ Equation (1b)

$$v_w = -\frac{KK_{rw}}{\mu_w}\nabla(p_w - \rho_w g D_Z),$$ Equation (1c)

$$S_g + S_W = 1,$$ Equation (1d)

$$\sum C_{i,g} = 1,$$ Equation (1e)

$$\sum C_{i,w} = 1,$$ Equation (1f)

where in Equation (1a), $-\nabla[(C_{i,g}\rho_g v_g + C_{i,w}\rho_w v_w)]$ is the flow term, $\nabla(D_{i,g}\rho_g \nabla C_{i,g} + D_{i,w}\rho_w \nabla C_{i,w})$ is the diffusion term, and $$\frac{\partial}{\partial t}[\varphi(C_{i,g}\rho_g S_g + C_{i,w}\rho_w S_w)]$$

is the cumulative term, the subscript i denotes carbon dioxide, water, or salt; the subscripts g and w denote the gas phase and the water phase, respectively; t denotes the time; φ denotes the porosity, and C denotes a mass fraction, $C_{i,g}$ and $C_{i,w}$ denote the mass fraction of the component i in the gas phase and the water phase, respectively; ρ denotes density; S denotes saturation, $S_g$ denotes saturation of the gas phase, and $S_w$ denotes saturation of the water phase; D denotes a diffusion coefficient, $D_{i,g}$ and $D_{i,w}$ denote the diffusion coefficient of component i in the gas phase and the water phase, respectively; $q_i$ refers to the source-sink term, which denotes an amount of carbon dioxide injected into the target region; v denotes a flow rate, and $v_g$ denotes the flow rate of the gas phase, and $v_w$ denotes the flow rate of the water phase;

in Equation (1b) and (1c), K denotes an absolute permeability of the formation; $K_{rg}$ and $K_{rw}$ are relative permeabilities of the gas phase and the water phase, respectively; μ is a fluid viscosity; $p_g$ and $p_w$ are the pressures of the gas phase and the water phase, respectively; g is a gravitational acceleration; $D_Z$ is a longitudinal depth;

the storage capacity determination model corresponding to the depleted oil reservoir is determined based on Equations (2a)-(2h) below:

$$\frac{\partial}{\partial t}[\varphi(C_{i,g}\rho_g S_g + C_{i,w}\rho_w S_w + C_{i,o}\rho_o S_o)] =$$ Equation (2a)

$$-\nabla[(C_{i,g}\rho_g v_g + C_{i,w}\rho_w v_w + C_{i,o}\rho_o v_o)] +$$

$$\nabla(D_{i,g}\rho_g \nabla C_{i,g} + D_{i,w}\rho_w \nabla C_{i,w} + D_{i,o}\rho_o \nabla C_{i,o}) + q_i,$$

$$v_g = -\frac{KK_{rg}}{\mu_g}\nabla(p_g - \rho_g g D_Z),$$ Equation (2b)

$$v_w = -\frac{KK_{rw}}{\mu_w}\nabla(p_w - \rho_w g D_Z),$$ Equation (2c)

$$v_o = -\frac{KK_{ro}}{\mu_o}\nabla(p_o - \rho_o g D_Z),$$ Equation (2d)

$$S_g + S_W + S_o = 1,$$ Equation (2e)

$$\sum C_{i,g} = 1,$$ Equation (2f)

where in Equations (2a)-(2h), the subscript i denotes carbon dioxide, water, or oil; the subscript o denotes the oil phase; the rest of the physical quantities are consistent with those in the storage capacity determination model corresponding to the deep saline aquifer;

the storage capacity determination model corresponding to the depleted gas reservoir is determined based on Equations (3a)-(3f) below:

$$\frac{\partial}{\partial t}[\varphi(C_{i,g}\rho_g S_g + C_{i,w}\rho_w S_w)] = -\nabla[(C_{i,g}\rho_g v_g + C_{i,w}\rho_w v_w)] + \nabla(D_{i,g}\rho_g \nabla C_{i,g} + D_{i,w}\rho_w \nabla C_{i,w}) + q_i, \quad \text{Equation (3a)}$$

$$v_g = -\frac{KK_{rg}}{\mu_g}\nabla(p_g - \rho_g g D_Z), \quad \text{Equation (3b)}$$

$$v_w = -\frac{KK_{rw}}{\mu_w}\nabla(p_w - \rho_w g D_Z), \quad \text{Equation (3c)}$$

$$S_g + S_W = 1, \quad \text{Equation (3d)}$$

$$\sum C_{i,g} = 1, \quad \text{Equation (3e)}$$

$$\sum C_{i,w} = 1, \quad \text{Equation (3f)}$$

where in Equations (3a)-(3f), the subscript i denotes carbon dioxide, water, or natural gas; the rest of the physical quantities are consistent with those in the storage capacity determination model corresponding to the deep saline aquifer.

* * * * *